(12) United States Patent
Cao et al.

(10) Patent No.: US 11,901,122 B2
(45) Date of Patent: Feb. 13, 2024

(54) HYBRID LITHIUM-ION BATTERY-CAPACITOR (H-LIBC) ENERGY STORAGE DEVICES

(71) Applicants: FLORIDA STATE UNIVERSITY RESEARCH FOUNDATION, INC., Tallahassee, FL (US); SPEL TECHNOLOGIES PRIVATE LIMITED, Pune (IN)

(72) Inventors: Wanjun Ben Cao, Tallahassee, FL (US); Jin Yan, Tallahassee, FL (US); Xujie Chen, Tallahassee, FL (US); Jian-Ping Zheng, Tallahassee, FL (US); Annadanesh Shellikeri, Tallahassee, FL (US); Mark Andrew Hagen, Tallahassee, FL (US)

(73) Assignees: FLORIDA STATE UNIVERSITY RESEARCH FOUNDATION, INC., Tallahassee, FL (US); SPEL TECHNOLOGIES PRIVATE LIMITED, Pune (IN)

( * ) Notice: Subject to any disclaimer, the term of this patent is extended or adjusted under 35 U.S.C. 154(b) by 151 days.

(21) Appl. No.: 17/552,908

(22) Filed: Dec. 16, 2021

(65) Prior Publication Data

US 2022/0277903 A1 Sep. 1, 2022

Related U.S. Application Data

(62) Division of application No. 16/385,626, filed on Apr. 16, 2019, now abandoned.
(Continued)

(51) Int. Cl.
*H01G 11/06* (2013.01)
*H01G 11/50* (2013.01)
(Continued)

(52) U.S. Cl.
CPC .............. *H01G 11/06* (2013.01); *H01G 11/24* (2013.01); *H01G 11/38* (2013.01); *H01G 11/46* (2013.01);
(Continued)

(58) Field of Classification Search
CPC ........ H01G 11/06; H01G 11/24; H01G 11/38; H01G 11/46; H01G 11/50; H01G 11/52; H01G 11/60; H01G 11/62; H01G 11/86
See application file for complete search history.

(56) References Cited

U.S. PATENT DOCUMENTS

| 5,963,417 A | 10/1999 | Anderson et al. |
| 6,503,432 B1 | 1/2003 | Barton et al. |

(Continued)

FOREIGN PATENT DOCUMENTS

WO    2006/109909 A1    10/2006

OTHER PUBLICATIONS

Hagen et al.: "Improving the specific energy of Li-ion capacitor laminate cell using hybrid activated Carbon/LiNi_0.5Co_0.2 Mn_0.3 O2 as positive electrodes", Journal of Power Sources vol. 379, Mar. 1, 2018, pp. 212-218.

(Continued)

*Primary Examiner* — Michael L Dignan
(74) *Attorney, Agent, or Firm* — Fox Rothschild LLP

(57) ABSTRACT

A hybrid lithium-ion battery-capacitor (H-LIBC) energy storage device includes a hybrid composite cathode electrode having a lithium ion battery (LIB) cathode active material and a lithium ion capacitor (LIC) cathode active material. An anode electrode having a surface is pre-loaded and pressed with a lithium (Li) thin film source. The anode electrode is pre-lithiated with the lithium film source by positioning the Li film source on the surface of anode electrode after electrolyte filling and soaking processes, a (Continued)

separator and an organic solvent electrolytic solution including a lithium salt electrolyte are also provided. A method of making a hybrid lithium-ion battery-capacitor and a method of making a hybrid composite cathode for a hybrid lithium-ion battery-capacitor are also disclosed.

18 Claims, 26 Drawing Sheets

Related U.S. Application Data

(60) Provisional application No. 62/658,082, filed on Apr. 16, 2018.

(51) Int. Cl.
  *H01G 11/52* (2013.01)
  *H01G 11/60* (2013.01)
  *H01G 11/62* (2013.01)
  *H01G 11/38* (2013.01)
  *H01G 11/24* (2013.01)
  *H01G 11/86* (2013.01)
  *H01G 11/46* (2013.01)

(52) U.S. Cl.
  CPC .............. *H01G 11/50* (2013.01); *H01G 11/52* (2013.01); *H01G 11/60* (2013.01); *H01G 11/62* (2013.01); *H01G 11/86* (2013.01)

(56) References Cited

U.S. PATENT DOCUMENTS

| | | |
|---|---|---|
| 2003/0134196 A1 | 7/2003 | Chen et al. |
| 2007/0287060 A1 | 12/2007 | Naoi et al. |
| 2009/0092903 A1 | 4/2009 | Johnson et al. |
| 2009/0226797 A1 | 9/2009 | Yoshitake et al. |
| 2012/0107680 A1* | 5/2012 | Amiruddin ......... H01M 4/0447 |
| | | 29/623.1 |
| 2012/0122652 A1 | 5/2012 | Worsley et al. |
| 2013/0045427 A1* | 2/2013 | Zhamu .............. H01M 10/0525 |
| | | 977/734 |
| 2013/0070391 A1 | 3/2013 | Zheng |
| 2013/0171502 A1 | 7/2013 | Chen et al. |
| 2015/0072234 A1 | 3/2015 | Mitchell et al. |
| 2017/0062140 A1* | 3/2017 | Zheng ................... H01M 4/525 |
| 2017/0301485 A1* | 10/2017 | Cao ........................ H01G 11/06 |
| 2018/0034037 A1 | 2/2018 | Zhang et al. |
| 2018/0261399 A1 | 9/2018 | Umetsu et al. |
| 2019/0157659 A1* | 5/2019 | Liu ......................... H01M 4/62 |

OTHER PUBLICATIONS

Cao et al.: "High Performance Li-ion Capacitor Laminate Cells Based on Hard Carbon/Lithium Stripes Negative Electrodes", Journal of the Electrochemical Society, vol. 164, issue 2, Dec. 9, 2016, pp. A93-A98.
"Activated Carbon", Wikipedia, Apr. 5, 2018, p. 7, retrieved Sep. 30, 2019 via the internet at <https://en.wikipedia.org/w/index.php?title=Activated_carbon&oldold=834361942>].
Yan et al.: "Influence of Lithium Iron Phosphate Positive Electrode Material to Hybrid Lithium-ion Battery Capacitor (H-LIBC) Energry Storage Devices", Journal of the Electrochemical Society, vol. 165, issue 11, Aug. 25, 2018, pp. A2774-A2780.
International Search Report dated Oct. 31, 2019 in PCT/US2019/27650.
Sun: "(LiNi0.5Coo.2Mno.302+ AC)/graphite hybrid energy storage device with high specific energy and high rate capability." Journal of Power Sources 243 (2013) 361-368).
Shellikeri: "Investigation of Pre-lithiation in Graphite and Hard-Carbon Anodes Using Different Lithium Source Structures." Journal of the Electrochemical Society, 164 (14) A3914-A3924 (2017).
Lipka S. M., Reisner D. E., Dai J., Cepulis R., in Proceedings of 11th International Seminar on Double Layer Capacitors, Florida Educational Seminars, Inc., Boca Raton (2001).
Zheng J. P., Jow T. R., J. Electrochem. Soc. 0013-4651, 142, L6 (1995).
W.J. Cao, Y.X. Li, B. Fitch, J. Shih, T. Doung, J.P. Zheng, "Strategies to optimize lithium-ion supercapacitors achieving high performance: Cathode configurations, lithium loadings on anode, and types of separator", Journal of Power Sources, 268, 841 (2014).
W.J. Cao and J.P. Zheng, "Li-ion Capacitors with Carbon Cathode and Hard Carbon/SLMP Anode Electrodes", J. Power Sources, 213, 180 (2012).
W.J. Cao, J.S. Zheng, D. Adams, J.P. Zheng, "Comparative Study of the Power and Cycling Performance for Advanced Lithium-Ion Capacitors with Various Carbon Anodes", J. Electrochem. Soc., 161, A2087 (2014).
P.L. Moss, G. Au, E.J. Plichta, and J.P. Zheng "Study of Capacity Fade of Lithium-Ion Polymer Rechargeable Batteries with Continuous Cycling", J. Electrochem. Soc. 157, A1 (2010).
Amatucci G. G., Badway F., Pasquier A. D., Zheng T., J. Electrochem. Soc. 0013-4651, 148, A930 (2001).
International Search Report from PCT/US2016/015627 dated Apr. 1, 2016.
Sun et al.: "The role of pre-lithiated in activated carbon/Li4Ti5012 asymmetric capacitors." Electrochimica Acta 236 (2017) 443-450 (Year 2017).
Sun et al.: "High performance lithium-ion hybrid capacitors with pre-lithiated hard carbon anodes and bifunctional cathode electrodes." Journal of Power Sources 270 (2014) 318-325 (Year: 2014).

\* cited by examiner (separators between cathode and anode are neglected in this figure)

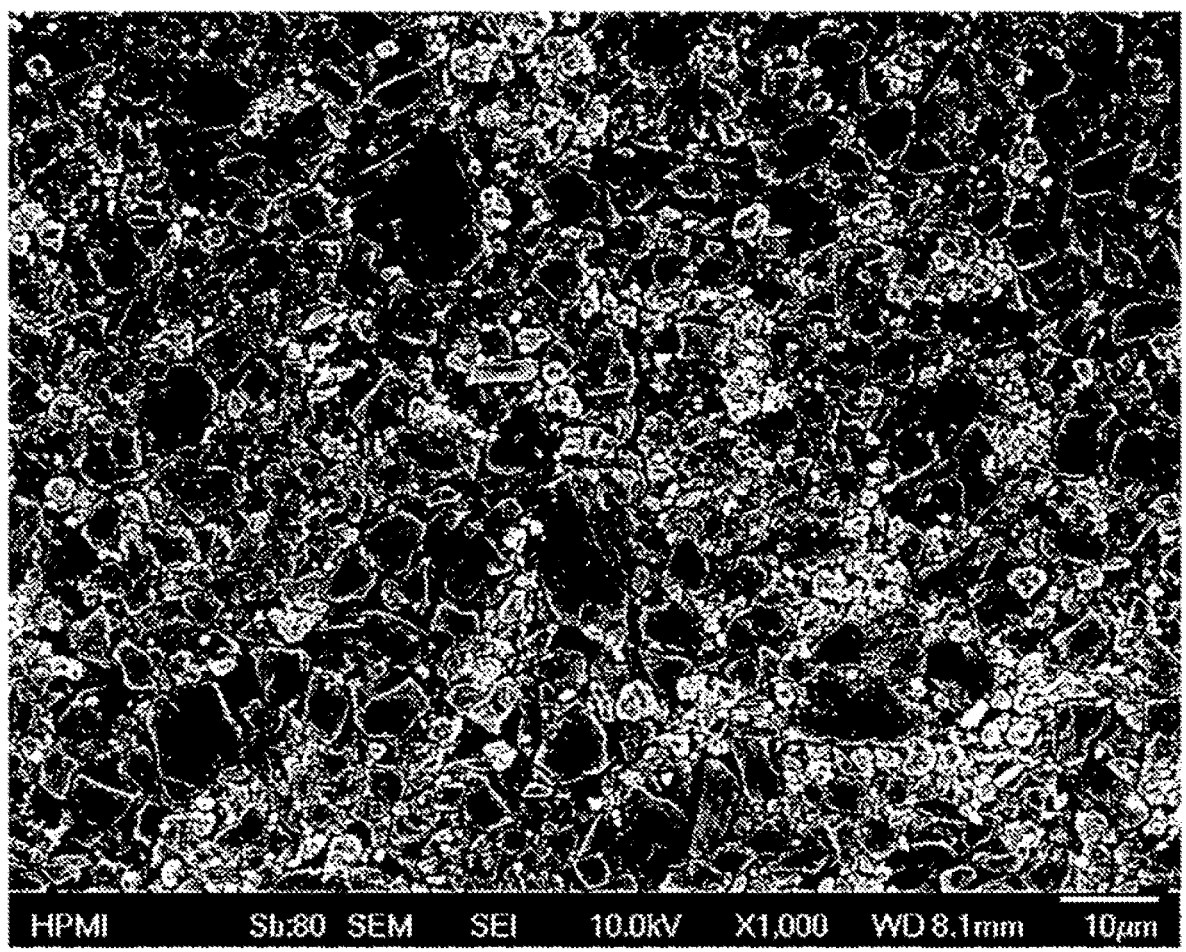
FIG. (5e)

HYBRID LITHIUM-ION BATTERY-CAPACITOR (H-LIBC) ENERGY STORAGE DEVICES

CROSS-REFERENCE TO RELATED APPLICATIONS

This application is a divisional application of U.S. patent application Ser. No. 16/385,626 filed on Apr. 16, 2019, which claims priority to U.S. Provisional Application No. 62/658,082 filed on Apr. 16, 2018, entitled "HYBRID LITHIUM-ION BATTERY CAPACITOR (H-LIBC) ENERGY STORAGE DEVICES", the entire disclosures of which are incorporated herein by reference.

STATEMENT REGARDING FEDERALLY SPONSORED RESEARCH AND DEVELOPMENT

This invention was made with government support under contract no. W911NF-15-2-0103 awarded by the U.S. Army Research Laboratory and contract no. N00014-17-1-2650 awarded by the Office of Naval Research. The government has certain rights in this invention.

FIELD OF THE INVENTION

The present invention is directed to energy storage devices, and more particularly to energy storage devices incorporating lithium.

BACKGROUND OF THE INVENTION

The lithium (Li)-ion battery (LIB) and electric double-layer capacitor (EDLC) are two widely used electrochemical energy storage devices. A typical LIB is made with a Li intercalated anode and a Li metal oxide cathode, and utilizes a redox process or faradaic mechanism of energy storage. The EDLC is made with a high surface area activated carbon (AC) for both the anode and the cathode, and utilizes a double layer capacitance or non-faradaic form of energy storage. As a consequence of these different energy storage mechanisms, the LIB and EDLC are distinct in their energy and power performance. The LIB has a high specific energy of 100-250 Wh·kg$^{-1}$; however, it has a low specific power of <0.5 kW·kg$^{-1}$ and a poor cycle life of <5,000 cycles. The EDLC has a high specific power of 10 kW·kg$^{-1}$ and a long cycle life over 100,000 cycles; however, it has a much lower specific energy of <6 Wh·kg$^{-1}$.

Energy storage devices which can combine the advantages of LIBs and EDLCs in a single form are highly desirable. As a new generation of supercapacitor, the Li-ion capacitor (LIC) is an advanced energy storage device which consists of an EDLC cathode and a pre-lithiated anode, between which the ions shuttle during charge and discharge processes. The LIC can be charged to a maximum voltage as high as 4.0 V, which is much higher than that of EDLCs and comparable to LIBs. Although the LIC can achieve a much higher power density than LIB, the current energy density of the LIC is about 10-20 Wh/kg which is still much less than the LIB. Therefore, the energy density of the LIC energy storage device needs to be further improved.

Several studies have investigated and elaborated composite cathode electrodes where a Li-ion insertion type battery material such as lithium iron phosphate (LFP) is combined with a double layer type capacitor material such as activated carbon (AC). This combination has proven to be very beneficial in improving the rate performance of LIB devices. These studies indicated the beneficial effects and advantages of combining a battery material with a capacitor material as a composite cathode include to various degrees high conductivity, high electrode tap density and specific capacity by enabling access to the battery materials through a highly conductive and porous capacitor material.

SUMMARY OF THE INVENTION

A hybrid lithium-ion battery-capacitor (H-LIBC) energy storage device includes a hybrid composite cathode electrode comprising a lithium ion battery (LIB) cathode active material and a lithium ion capacitor (LIC) cathode active material. An anode electrode has a surface and includes a thin lithium (Li) film source, a separator and an organic solvent electrolytic solution comprising a lithium salt electrolyte.

The anode electrode is pre-lithiated with the lithium film source by positioning and pressing the Li film source on the surface of anode electrode after electrolyte filling and soaking processes. The mass of the Li film source is calculated by the equation:

$$m_{Li} = \frac{xm_A c_{A1} - m_B c_B - \dfrac{m_C c_C (V_{max} - V_{c-OCV})}{3.6}}{c_{Li}}$$

where $m_{Li}$ is the Li film source mass to be pre-lithiated on the surface of the anode (g), $c_{Li}$ is the specific capacity of lithium and is 3,860 mAh/g, $m_A$ is the anode active layer weight (g), $m_B$ is the Li-ion battery (LIB) active material weight (g), $m_C$ is the Li-ion capacitor (LIC) active material weight (g), $c_{A1}$ is the first lithium intercalation (1st discharge) specific capacity (mAh/g) of the anode electrode, $c_B$ is the specific capacity (mAh/g) of the LIB active material, $c_C$ is the specific capacitance (F/g) of the LIC active material, $V_{max}$ is the maximum operating voltage of H-LIBC, $V_{c-OCV}$ is the open-circuit voltage of LIC activated material is from 2.5 V to 3.2 V, and x is between 0.5 to 1.0, The capacity ratio $\gamma_{C:A}$ of the hybrid composite cathode electrode to the anode electrode can be from 0.14 to 1.13. The specific surface area of the LIC cathode active material can be greater than 1,000 m$^2$/g.

The LIB cathode active material can include a lithium metal oxide. The lithium metal oxide can include at least one selected from the group consisting of lithium metal oxide comprising LiCoO$_2$ (lithium cobalt oxide), LiNi$_{0.8}$Co$_{0.15}$Al$_{0.05}$O$_2$ (NCA), LiNi$_{0.5}$Mn$_{0.3}$Co$_{0.2}$O$_2$ (NMC532), LiNi$_{0.6}$Mn$_{0.2}$Co$_{0.2}$O$_2$ (NMC622), LiNi$_{0.8}$Mn$_{0.1}$Co$_{0.1}$O$_2$ (NMC811), and LiFePO$_4$ (LFP).

The LIC cathode active material in the hybrid composite cathode electrode can include at least one selected from the group consisting of activated carbon (AC) and carbon black (CB).

The mass ratio of the LIC cathode active material to the LIB cathode active material in the hybrid composite cathode electrode can be from 0.1 to 9.0.

The hybrid composite cathode electrode can be fabricated by a dry method manufacturing process. The binder used in the dry method manufacturing process can include polytetrafluoroethylene (PTFE). The active layer porosity of the hybrid composite cathode electrode can be from 20% to 75%.

The anode electrode active material can include at least one selected from the group consisting of hard carbon, graphite, and soft carbon. The mass median diameter (D50) particle size of the anode electrode active material can be from 1 μm to 10 μm.

The anode electrode can include styrene-butadiene rubber (SBR) and carboxymethyl cellulose (CMC) as binders, and wherein the mass ratio of SBR binder to CMC binder is from 1:5 to 5:1. The thickness of the Li film source can be from 2 μm to 40 μm.

The capacity ratio $\gamma_{C:A}$ of the hybrid composite cathode to the anode electrode can be described by the equation:

$$\gamma_{C:A} = \frac{m_B c_B + \frac{m_C c_C (V_{max} - V_{min})}{3.6}}{m_A c_{Ar}}$$

where $V_{min}$ is the minimum operating voltage of the H-LIBC, and $c_{Ar}$ is the reversible lithium intercalation and de-intercalation specific capacity (mAh/g) of the anode active material layer.

The peak open circuit voltage of the H-LIBC energy storage device during the first 5 hours of an electrolyte soaking process can be from 2.4 V to 3.0 V.

The H-LIBC energy storage device can include a H-LIBC laminate cell. The anode electrode can be double sided, and each side of the double sided anode can be pre-lithiated with the Li film source after electrolyte filling and soaking processes.

The amount of Li pre-lithiated onto the surface of the anode to fully pre-lithiate the anode is 4 to 12% based upon the Li pre-lithiated mass/anode active layer mass.

A method for making a hybrid composite cathode for a H-LIBC can include the step of providing a lithium metal oxide, activated carbon and a binder as dry powders. The lithium metal oxide, activated carbon and binder are mixed to create a homogeneous cathode dry powder mixture. The cathode dry powder mixture is pressed at a temperature of at least 50° C. to produce a free-standing cathode film. The cathode film is laminated onto a current collector by passing the cathode film and the current collector through the gap of two rollers maintained at a temperature of at least 100° C.

A method of making a hybrid lithium-ion battery-capacitor H-LIBC can begin with the step of preparing a hybrid composite cathode. The hybrid composite cathode can be prepared by the step of providing a lithium metal oxide, activated carbon and a binder as dry powders. The lithium metal oxide, activated carbon and binder are mixed to create a homogenous cathode dry powder mixture. The cathode dry powder mixture is pressed at a temperature of at least 50° C. to produce a free-standing cathode film. The cathode film is laminated onto a current collector by passing the cathode film and the current collector through the gap of two rollers maintained at a temperature of at least 100° C.

The method of making a hybrid lithium-ion battery-capacitor H-LIBC can include the step of preparing an anode. The anode for the H-LIBC can be prepared by the step of providing an anode active material having a surface, and a thin Li film source pre-positioned and pressed on the surface of anode electrode. The mass of the Li film source can be calculated by the equation:

$$m_{Li} = \frac{x m_A c_{A1} - m_B c_B - \frac{m_C c_C (V_{max} - V_{c-OCV})}{3.6}}{c_{Li}}$$

where $m_{Li}$ is the Li source mass to be pre-lithiated on the surface of the anode (g), $c_{Li}$ is the specific capacity of lithium and is 3,860 mAh/g, $m_A$ is the anode active layer weight (g), $m_B$ is the Li-ion battery (LIB) active material weight (g), $m_C$ is the Li-ion capacitor (LIC) active material weight (g), $c_{A1}$ is the first lithium intercalation (1st discharge) specific capacity (mAh/g) of the anode electrode, $c_B$ is the specific capacity (mAh/g) of the LIB active material, $c_C$ is the specific capacitance (F/g) of the LIC active material layer, $V_{max}$ is the maximum operating voltage of H-LIBC, $V_{c-OCV}$ is the open-circuit voltage of LIC activated material is from 2.5 V to 3.2 V, and x is between 0.5 to 1.0

The method of making a hybrid lithium-ion battery-capacitor H-LIBC can also include the step of providing a separator, and providing an electrolytic solution containing a lithium salt electrolyte. The hybrid composite cathode, the pre-lithiated anode, the separator and the electrolyte are combined to form a H-LIBC energy storage device.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF THE INVENTION

Figure 1:
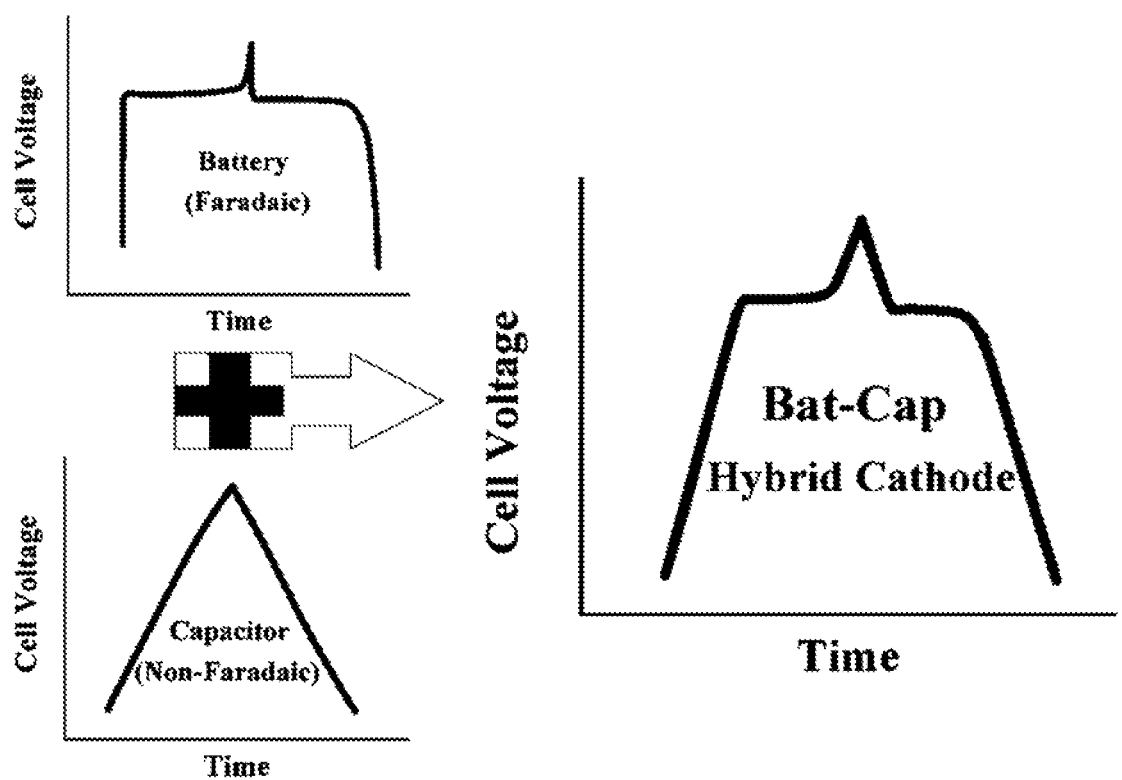
FIG. 1 depicts a hybrid composite cathode potential profile vs. Li/Li$^+$, combining faradaic and non-faradaic types of charge storage for H-LIBC energy storage devices.

A hybrid lithium-ion battery-capacitor (H-LIBC) energy storage device according to the invention combines the advantages of both the LIB and the LIC, avoiding the inherent disadvantages of each, while bridging the gap between the high energy density offered by LIBs and the high-power density provided by the LIC. As seen from the potential profile of the hybrid cathode in FIG. 1, the non-faradaic capacitor material is initially charged electrostatically until the electrode potential reaches the redox reaction potential of the faradaic battery material, where the battery material is charged while maintaining a constant battery redox reaction potential. Once fully charged, the capacitor material is charged again until a limiting potential is reached for the capacitor material.

The composite cathode of the invention combines double layer capacitance, which is surface limited, with materials that store charge through redox reactions, which are limited by the charge transfer kinetics and diffusional processes but are not limited to the material surface and hence the bulk can be accessed and utilized, resulting in greater charge storage. The H-LIBC device does not require any electric circuits for charge balancing and control when compared with conventional external hybrid energy storage sources. The energy density and power density of the hybrid cell can be designed to meet the requirements by a reasonable distribution of the ratio between LIB and LIC cathode electrode materials in the internal H-LIBC. For example, in a H-LIBC laminate cell made with a 20 wt. % LiFePO$_4$ (LFP) and 80 wt. % activated carbon (AC) mixed cathode and a pre-lithiated hard carbon anode, the specific energy increased by 40% compared with conventional LIC. Lithium metal oxides such as LFP are a high specific capacity and high potential battery materials which can de-intercalate and intercalate lithium, while the AC is a highly conductive and porous material which provides good power capability and adsorption of electrolyte, and also contributes towards surface charge storage.

The anode is pre-lithiated with a lithium thin film source pre-loaded on the anode surface after electrolyte is filled into the final cell. The mass of Li pre-loaded and pressed on surface of the anode is determined according to the invention by the lithium metal oxide mass percentage in the composite cathode electrode active layer, and the capacity ratio of the cathode to the anode. The invention demonstrates performance of such a composite cathode and cell design for a large number of charge/discharge cycles in a H-LIBC full cell format.

The invention employs a hybrid cathode composite electrode fabrication method to improve the performance of hybrid energy storage cells including energy, power and cycle life. A dry electrode fabrication method produces electrodes for internal H-LIBC cells, and provides high electrode tap density, good mechanical properties for the electrode, good adhesion between the electrode and the current collector, and low contact resistances.

It has been shown that the cycle-life of a H-LIBC is greatly influenced and limited by the anode electrode. Also, the lower potential limit of the anode electrode is determined mainly by the mass capacity ratio between anode and cathode. The more anode material in the cell, the greater is the cycle life and the anode potential is further away from the Li-plating potential of 0 V vs. Li$^+$/Li. The use of excess anode material can result in additional inactive material, which lowers the energy density. Therefore, there is a tradeoff between energy density and cycle life.

The anode electrode surface is pre-loaded and pressed with a Li metal film source and the anode will be pre-lithiated after filling electrolyte into the cell in order to ensure that the anode operates in an appropriate potential range during charge and discharge cycles after the cell electrolyte soaking and formation processes. The pre-loaded Li also compensates for the first cycle loss during solid electrolyte interface (SEI) formation. The H-LIBC will not consume salt in the electrolyte during the charge/discharge cycles, which is crucial in ensuring long cycle life and high energy density. The mass of Li sources pre-loaded on the surface of the anode is calculated based on the hybrid cathode composite electrode and the capacity ratio of cathode to anode.

A hybrid lithium-ion battery-capacitor (H-LIBC) energy storage device includes a hybrid composite cathode electrode comprising a lithium ion battery (LIB) cathode active material and a lithium ion capacitor (LIC) cathode active material. An anode electrode has a surface and includes a thin lithium (Li) film source, a separator and an organic solvent electrolytic solution comprising a lithium salt electrolyte.

The anode electrode is pre-lithiated with the lithium film source by positioning and pressing the Li film source on the surface of anode electrode. The mass of the Li film source is calculated by the equation:

$$m_{Li} = \frac{xm_A c_{A1} - m_B c_B - \dfrac{m_C c_C (V_{max} - V_{c-OCV})}{3.6}}{c_{Li}}$$

where $m_{Li}$ is the Li film source mass to be pre-lithiated on the surface of the anode (g), $c_{Li}$ is the specific capacity of lithium and is 3,860 mAh/g, $m_A$ is the anode active layer weight (g), $m_B$ is the Li-ion battery (LIB) active material weight (g), $m_C$ is the Li-ion capacitor (LIC) active material weight (g), $c_{A1}$ is the first lithium intercalation (1st discharge) specific capacity (mAh/g) of the anode electrode, $c_B$ is the specific capacity (mAh/g) of the LIB active material, $c_C$ is the specific capacitance (F/g) of the LIC active material, $V_{max}$ is the maximum operating voltage of H-LIBC, $V_{c-OCV}$ is the open-circuit voltage of LIC activated material is from 2.5 V to 3.2 V, and x is between 0.5 to 1.0.

The capacity ratio $\gamma_{C:A}$ of the hybrid composite cathode electrode to the anode electrode is from 0.14 to 1.13. The capacity ratio of the hybrid composite cathode electrode to the anode electrode can be 0.14, 0.20, 0.25, 0.30, 0.35, 0.40, 0.45, 0.50, 0.55, 0.60, 0.70, 0.75, 0.80, 0.85, 0.90, 0.95, 1.00, 1.05, 1.10, or 1.13, or within a range of any high value and low value selected from these values. The specific surface area of the LIC cathode active material is greater than 1,000 m$^2$/g.

The LIB cathode active material can include a lithium metal oxide. The lithium metal oxide can be at least one selected from the group consisting of lithium metal oxide comprising LiCoO$_2$ (lithium cobalt oxide), LiNi$_{0.8}$Co$_{0.15}$Al$_{0.05}$O$_2$ (NCA), LiNi$_{0.5}$Mn$_{0.3}$Co$_{0.2}$O$_2$ (NMC532), LiNi$_{0.6}$Mn$_{0.2}$Co$_{0.2}$O$_2$ (NMC622), LiNi$_{0.8}$Mn$_{0.1}$Co$_{0.1}$O$_2$ (NMC811), and LiFePO$_4$ (LFP). Other lithium metal oxides are possible.

The LIC cathode active material in the hybrid composite cathode electrode can include least one selected from the group consisting of activated carbon (AC) and carbon black (CB). Other LIC cathode active materials are possible.

The mass ratio of the LIC cathode active material to the LIB cathode active material in the hybrid composite cathode electrode can be from 0.1 to 9.0. The mass ratio of the LIC cathode active material to the LIB cathode active material in the hybrid composite cathode electrode can be 0.1, 0.2, 0.3, 0.4, 0.5, 0.6, 0.7, 0.8, 0.9, 1, 1.1, 1.2, 1.3, 1.4, 1.5, 1.0, 1.7, 1.8, 1.9, 2, 2.1, 2.2, 2.3, 2.4, 2.5, 2.0, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, and 9, or within a range of any high value and low value selected from these values.

The hybrid composite cathode electrode can be fabricated by a dry method manufacturing process. The binder used in the dry method manufacturing process can include polytetrafluoroethylene (PTFE). Other binders can be used.

The active layer porosity of the hybrid composite cathode electrode can be from 20% to 75%. The active layer porosity of the hybrid composite cathode electrode can be 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74% and 75%, or within a range of any high value and low value selected from these values.

The anode electrode active material can include at least one selected from the group consisting of hard carbon, graphite, and soft carbon. Other anode electrode active materials are possible.

The mass median diameter (D50) particle size of the anode electrode active material can be from 1 µm to 10 µm. The mass median diameter (D50) particle size of the anode electrode active material can be 1, 2, 3, 4, 5, 6, 7, 8 and 9 µm, or within a range of any high value and low value selected from these values.

The binder for the anode electrode can be any suitable binder. The anode electrode can include styrene-butadiene rubber (SBR) and carboxymethyl cellulose (CMC) as binders. The mass ratio of SBR binder to CMC binder can be from 1:1 to 5:1.

The thickness of the Li film source can vary. The thickness of the Li film source can be from 2 µm to 40 µm. The thickness of the Li film source can be 2, 3, 4, 5, 6, 7, 8, 9, 10, 11, 12, 13, 14, 15, 16, 17, 18, 19, 20, 21, 22, 23, 24, 25, 26, 27, 28, 29, 20, 31, 32, 33, 34, 35, 36, 37, 38, 39, and 40 µm, or can be within a range of any high value and low value selected from these values.

The capacity ratio $\gamma_{C:A}$ of the hybrid composite cathode to the anode electrode can be described by the equation:

$$\gamma_{C:A} = \frac{m_B c_B + \frac{m_C c_C (V_{max} - V_{min})}{3.6}}{m_A c_{Ar}}$$

where $V_{min}$ is the minimum operating voltage of the H-LIBC, and $c_{Ar}$ is the reversible lithium intercalation and de-intercalation specific capacity (mAh/g) of the anode active material layer.

The peak open circuit voltage of the H-LIBC energy storage device during the first 5 hours of an electrolyte soaking process can be from 2.4 V to 3.0 V.

The H-LIBC energy storage device of the invention can be fabricated in different cell designs. The H-LIBC energy storage device can be a H-LIBC laminate cell. The anode electrode can be made to be double sided, and each side of the double sided anode is pre-lithiated with the Li film source after electrolyte filling and soaking process.

The amount of Li pre-loaded and pressed onto the surface of the anode to fully pre-lithiate the anode after electrolyte filling and soaking processes is 4 to 12% (see Table 2 column Li/NE % range) based upon the Li pre-lithiated mass/anode active layer mass. The amount of Li pre-loaded and pressed onto the surface of the anode to fully pre-lithiate the anode after electrolyte filling and soaking processes, based upon the Li pre-loaded mass/anode active layer mass, can be 4%, 5%, 6%, 7%, 8%, 9%, 10%, 11% and 12%, or within a range of any high value and low value selected from these values.

A method for making a hybrid composite cathode for a H-LIBC can include the step of providing a lithium metal oxide, activated carbon and a binder as dry powders. The lithium metal oxide, activated carbon and binder are mixed to create a homogenous cathode dry powder mixture. The cathode dry powder mixture is pressed at a temperature of at least 50° C. to produce a free-standing cathode film. The cathode film is laminated onto a current collector by passing the cathode film and the current collector through the gap of two rollers maintained at a temperature of at least 100° C.

A method of making a H-LIBC with the hybrid composite cathode includes the step of preparing an anode. The anode is prepared by providing an anode active material having a surface, and a thin Li film source. The thin Li film source is pre-positioned on the surface of anode electrode. The mass of the thin Li film source is calculated by the equation:

$$m_{Li} = \frac{x m_A c_{A1} - m_B c_B - \frac{m_C c_C (V_{max} - V_{c-OCV})}{3.6}}{c_{Li}}$$

where $m_{Li}$ is the Li source mass to be pre-loaded and pressed on the surface of the anode (g), $c_{Li}$ is the specific capacity of lithium and is 3,860 mAh/g, $m_A$ is the anode active layer weight (g), $m_B$ is the Li-ion battery (LIB) active material weight (g), $m_C$ is the Li-ion capacitor (LIC) active material weight (g), $c_{A1}$ is the first lithium intercalation (1st discharge) specific capacity (mAh/g) of the anode electrode, $c_B$ is the specific capacity (mAh/g) of the LIB active material, $c_C$ is the specific capacitance (F/g) of the LIC active material layer, $V_{max}$ is the maximum operating voltage of H-LIBC, $V_{c-OCV}$ is the open-circuit voltage of LIC activated material is from 2.5 V to 3.2 V, and x is between 0.5 to 1.0.

A separator is provided. Any suitable separator is possible. An electrolytic solution comprising a lithium salt electrolyte is provided. The hybrid composite cathode, the pre-lithiated anode, the separator and the electrolyte are combined to form a H-LIBC energy storage device.

There is seen in FIG. 1 an illustration of a hybrid composite cathode potential profile, combining faradaic and non-faradaic types of charge storage for H-LIBC energy storage devices.

EXAMPLE 1

Figure 2:
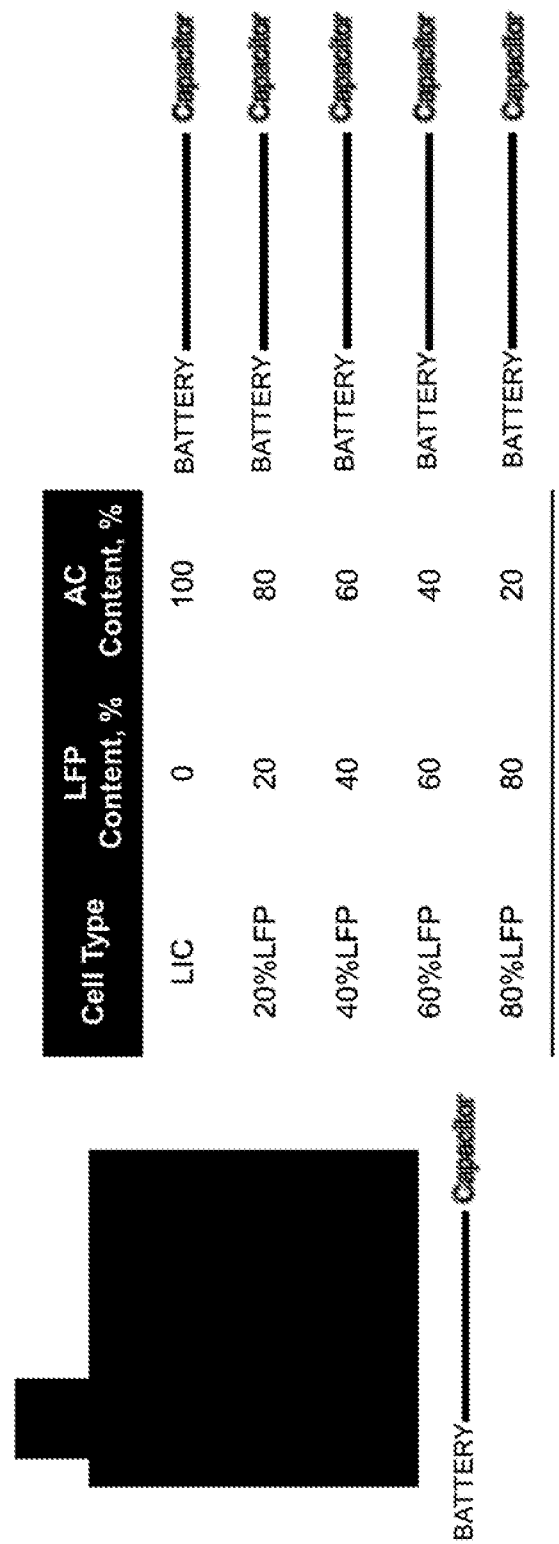
FIG. 2 is a schematic illustration of various hybrid composite cathode positive electrode designs.

Commercial active materials were used for the negative electrode (NE/anode) and positive electrode (PE/cathode) preparations. Four types of hybrid composite cathode PEs were prepared with various mass ratios of LFP:AC including 20:80 (20% LFP), 40:60 (40% LFP), 60:40 (60% LFP) and 80:20 (80% LFP) as shown in FIG. 2. Dry methods of electrode fabrication were used.

A pure AC reference electrode (LIC with 0% LFP) was prepared as a control group. A free-standing film was first prepared by mixing the above various mass ratios of LFP:

AC (0% to 80% LFP), with 8 wt. % Polytetrafluoroethylene (PTFE, DuPont™) as a binder, based on the total hybrid composite cathode electrode active layer weight. LFP nanoparticles were received from the manufacturer pre-coated with a thin layer of carbon and were used as received. The carbon coating is known to have a beneficial effect on capacity and rate performance. This mixture was blended in a dry process by a high-speed blender until a homogenous cathode dry powder mixture was obtained.

The cathode dry powder mixture was then pressed and calendared to the desired thickness at 100° C., forming a free-standing cathode film. The free-standing cathode film was then laminated at 200° C. to an etched aluminum (Al) current collector. The aluminum current collector had an 8-10 μm conductive coating on both sides of the etched Al foil to achieve better contact and conductivity between the current collector and the cathode film active material layer. The single-sided cathode active material layer thickness for the all of the hybrid LFP/AC composite cathode electrodes was about 100-120 μm. The electrode tap densities are shown in Table 1 below.

TABLE 1

Hybrid LFP/AC composite cathode electrode density and porosity

| Cathode Name | LIC (0% LFP) | 20% LFP | 40% LFP | 60% LFP | 80% LFP |
| --- | --- | --- | --- | --- | --- |
| Tapped density (g/cm$^3$) | 0.56 | 0.66 | 0.80 | 1.03 | 1.49 |
| LFP Bulk density (g/cm$^3$) | 3.6 | 3.6 | 3.6 | 3.6 | 3.6 |
| AC Bulk density (g/cm$^3$) | 2.2 | 2.2 | 2.2 | 2.2 | 2.2 |
| Porosity | 75% | 72% | 69% | 64% | 53% |

The anode consisted of hard carbon (HC) as the active material. A slurry mixture of the HC anode material was made in which the HC had a particle size (D50) of 2 μm, with SBR/CMC as the binder. The mass ratio of the anode composition was 96:3:1 (HC:SBR:CMC). After the slurry was prepared, it was coated onto a copper (Cu) foil substrate that had a thickness of 10 μm. The electrodes were dried at 160° C. for 3 h in oven with flowing air. Anode electrode sheets with a single-side active material layer thickness of ~95 μm and tap density of 1.0 g·cm$^{-3}$ were fabricated. The porosity of the HC anode was about 50%. The electrodes were then punched from the electrode sheets to the desired dimensions 4.6 cm×4.6 cm (active area) for anodes and 4.5 cm×4.5 cm for cathodes, then vacuum dried at 120° C. overnight and transferred to dry room environment before final cell assembly.

Figure 3:
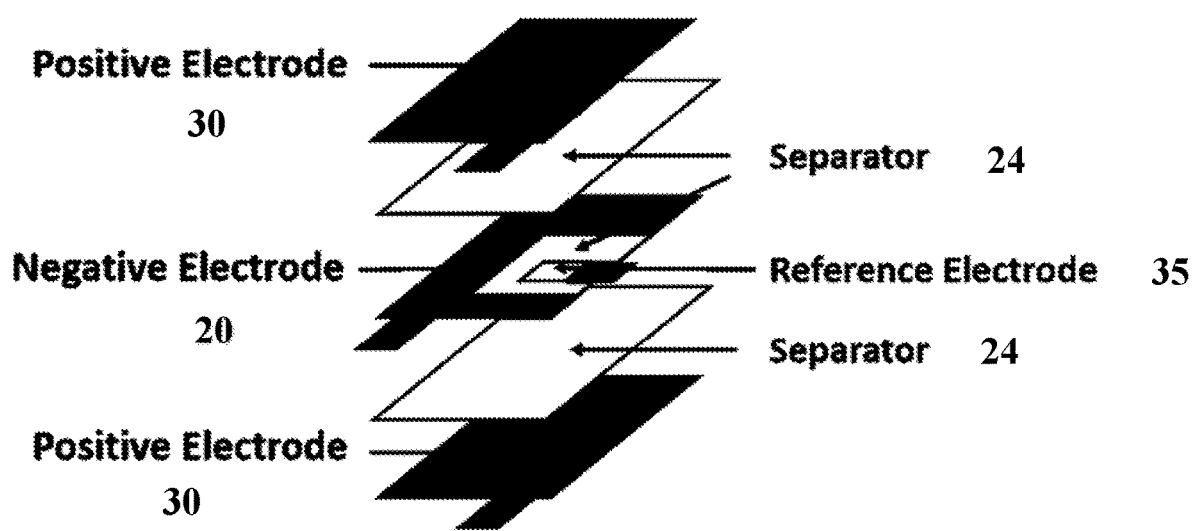
FIG. 3 is a schematic illustration of 3-electrode test cell configuration and structure.

FIG. 3 depicts an illustration of 3-electrode test cell configuration and structure. A double-sided negative electrode 20 is positioned between two separators 24, and positive electrodes 30 adjoin the separators opposite the negative electrode side. A reference negative electrode 35 was fashioned in the negative electrode.

An important part of cell assembly was the Li thin film source pre-loading and pressing step which was performed on all the anodes in full cell configuration. Thin Li films were cut from a 20 μm Li-metal sheets (99.9% purity) to be used as the Li film source for pre-lithiation. Various sizes were used to fabricate various LFP/AC hybrid composite cathode-based H-LIBC cells. Based on the HC anode the first lithium intercalation specific capacity was about 372 mAh/g. The amount of Li pre-loaded onto the surface of the HC anode to fully pre-lithiate the HC was determined to be ~10% (Li pre-loaded mass/anode active layer mass). In a LIC (0% LFP) cell design, the anode needs to be fully pre-lithiated (~10% lithium loading) after electrolyte filling and soaking processes since the capacity ratio of the cathode:anode is about 0.14 (1:7).

The LIC cell design enables the LIC to have a long cycle life (more than 100,000 cycles) and high energy and power densities. However, when LFP is mixed in the hybrid composite cathode according to the invention, the LFP will provide an additional lithium source from the hybrid cathode when the H-LIBC is charging to the maximum operating voltage. In order to avoid anode lithium dendrite growth during the cell charging process, the actual Li film mass loadings on the surface of the anode should deduct the lithium source portion provided from the LFP or other lithium metal oxide in the hybrid cathode, and it should be less than 10% of the anode active layer weight. It can be concluded that with more lithium metal oxide in the cathode, less Li from the Li film source at the anode will be required.

The Li film loading was performed in a dry room environment by applying pressure. As shown in FIG. 3, the 3-electrode cells in pouch format were assembled with a Li foil as the reference electrode 35 to monitor the cathode and anode potential changes during charge-discharge process. A plastic separator was used. The 3-electrode full cells consisted of a sandwich structure, with a double-sided HC anode pre-loaded with Li film sources and two single side LFP/AC composite cathodes. The electrolyte used was 1 M LiPF$_6$ in a 1:1 by weight mixture of ethylene carbonate (EC) and dimethyl carbonate (DMC) (BASF). The pouch cell assembly was performed in dry room environment (−40° C. Dew Point).

Figure 4:
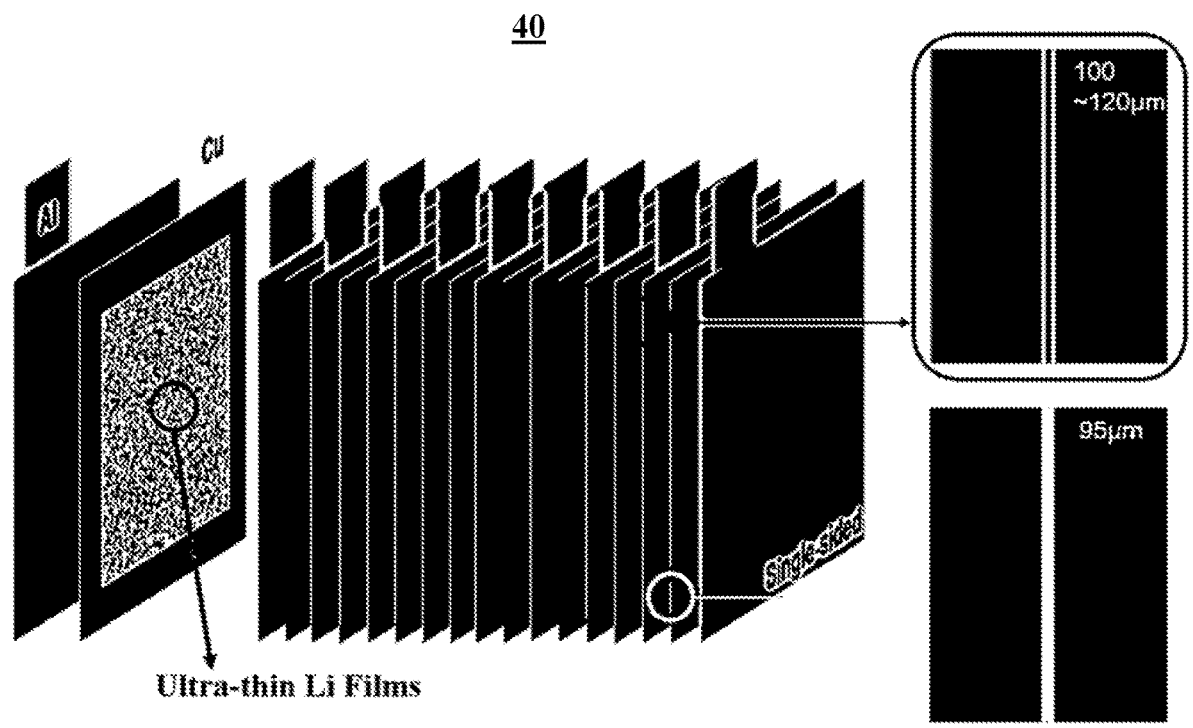
FIG. 4 is a schematic illustration of nine-layer H-LIBC laminate cell with 20 μm thickness ultra-thin lithium films as the Li sources (separators between cathode and anode are neglected).

FIG. 4 depicts a schematic illustration of a nine-layer H-LIBC laminate cell 40 with 20 μm thickness thin lithium films as the anode Li source. The electrolyte injection and soaking was performed in an argon-filled glovebox (0.1 ppm H$_2$O, 0.1 ppm O$_2$), with a soaking period of 24 hours. After the 3-electrode pouch format cells were assembled, nine-layer (10 PEs/9 NEs) H-LIBC laminate cells with the same cathode, anode and Li film sources described above were constructed as shown in FIG. 4. Separators were provided between each electrode layer. The nine-layer H-LIBC laminate cells were used to test the electrochemical performance including energy, power densities, and long-term cycle life.

Scanning electron microscopy (SEM) images of electrodes were recorded using a JEOL JSM-7401F microscope. The electrochemical characterization performed on full cells was carried out on pouch cells. 3-electrode pouch cells were charged-discharged under a constant current of 11.4 mA from 3.8 to 2.2 V and the cathode and anode potentials vs. Li/Li$^+$ were monitored through the Li reference third electrode. All of the nine-layer LIC and H-LIBC laminate cells were tested under constant currents of 80 mA and 4 A from 3.8 to 2.2 V for initial capacitance (C) and ESR results. From the C and ESR results, the specific energy, energy density, max. specific power, max. power density of LIC and H-LIBC laminate cells can be calculated. After the initial C and ESR tests, the electrochemical impedance spectrum (EIS) of the nine-layer laminate cells were recorded using a Gamry Instruments Reference 3000 Potentiostat.

The frequency range was from 0.01 Hz to 10$^6$ Hz and the amplitude was 10 mV. After the EIS tests, all nine-layer laminate cells were discharging under various constant specific power from 10 W/kg to 10,000 W/kg to obtain the specific energy under various average specific power, therefore the Ragone Plot of all the LIC and H-LIBC energy storage devices can be obtained. A high-power LIC100F laminate cell was used as a control group and compared with LIC200F and other H-LIBC laminate cells.

The nine-layer laminate cells were put under cycling performance testing. The nine-layer H-LIBC laminate cells were charged and discharged under constant currents of 5 A for various cycles to obtain the cycling performance. The electrochemical performance of all cells was tested by a Neware Testing Cycler Unit and laminate cells were clamped with acrylic plates under a constant pressure of 10 kg during all testing.

Figure 5A:
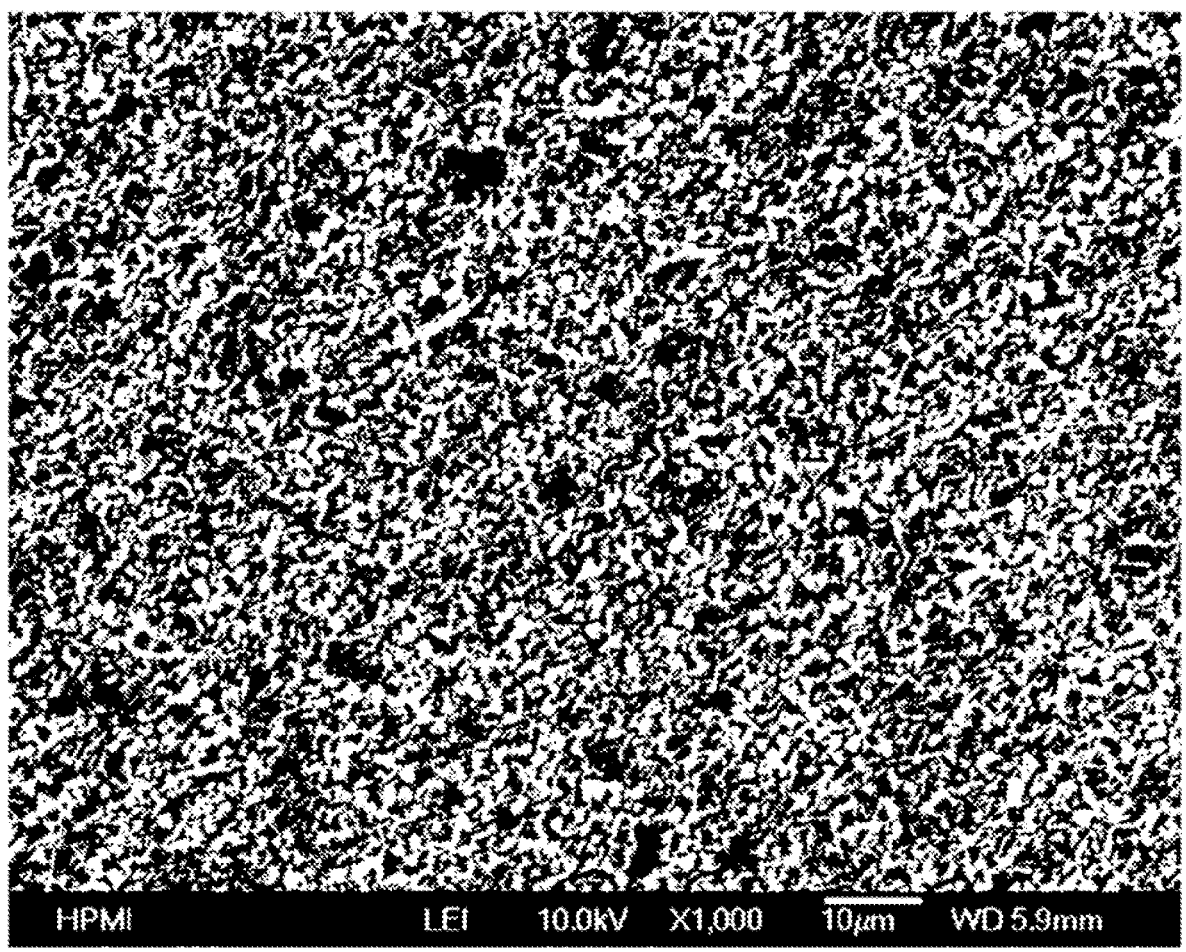
FIGS. 5(a-g) depict FIG. 5(a) SEM micrographs of a HC anode, FIG. 5(b) a LIC (AC, 0% LFP) cathode, FIG. 5(c1) and FIG. 5(c2) LFP powders, FIG. 5(d) a composite cathode 20% LFP, FIG. 5(e) a composite cathode 40% LFP, FIG. 5(f) a composite cathode 60% LFP, and FIG. 5(g) a composite cathode 80% LFP.
Figure 5B:
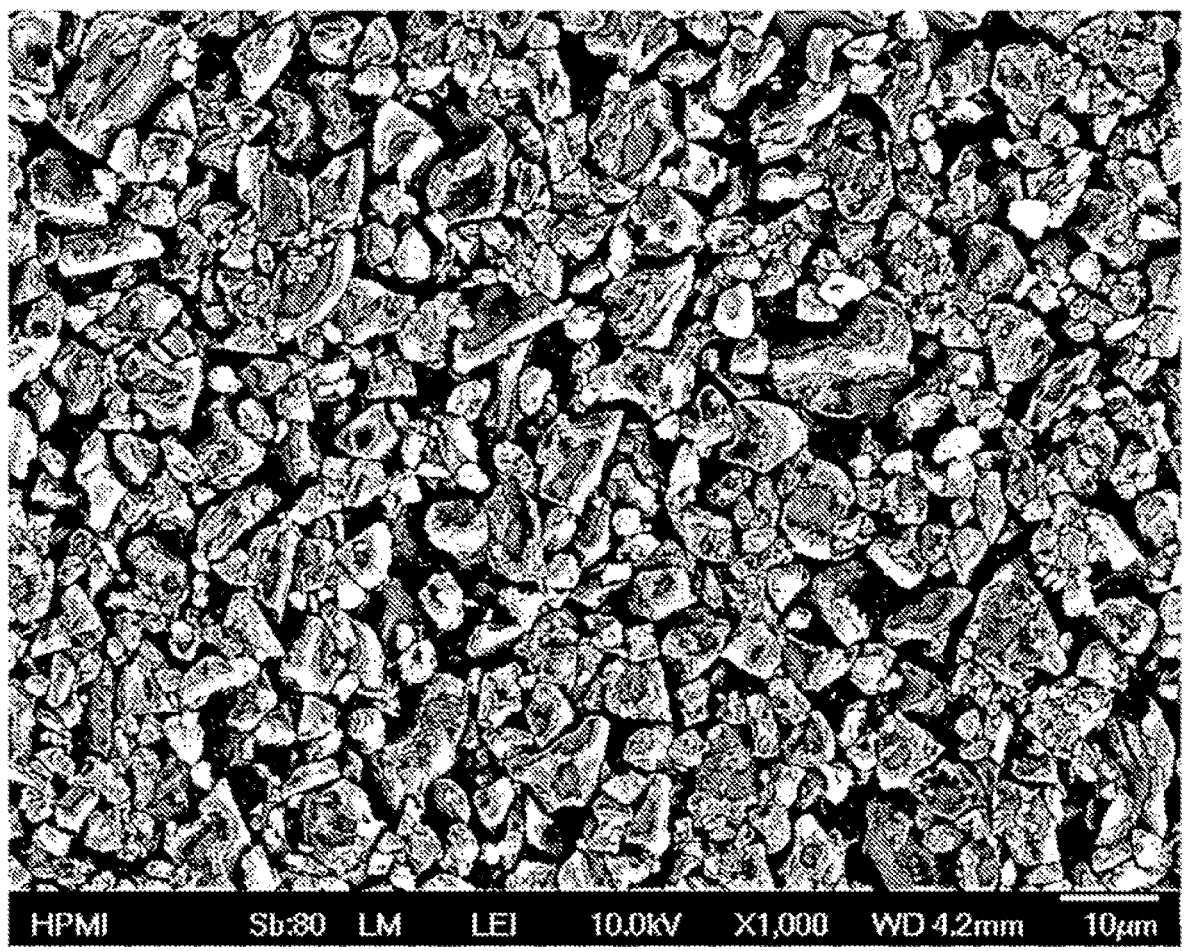
Figure 5:
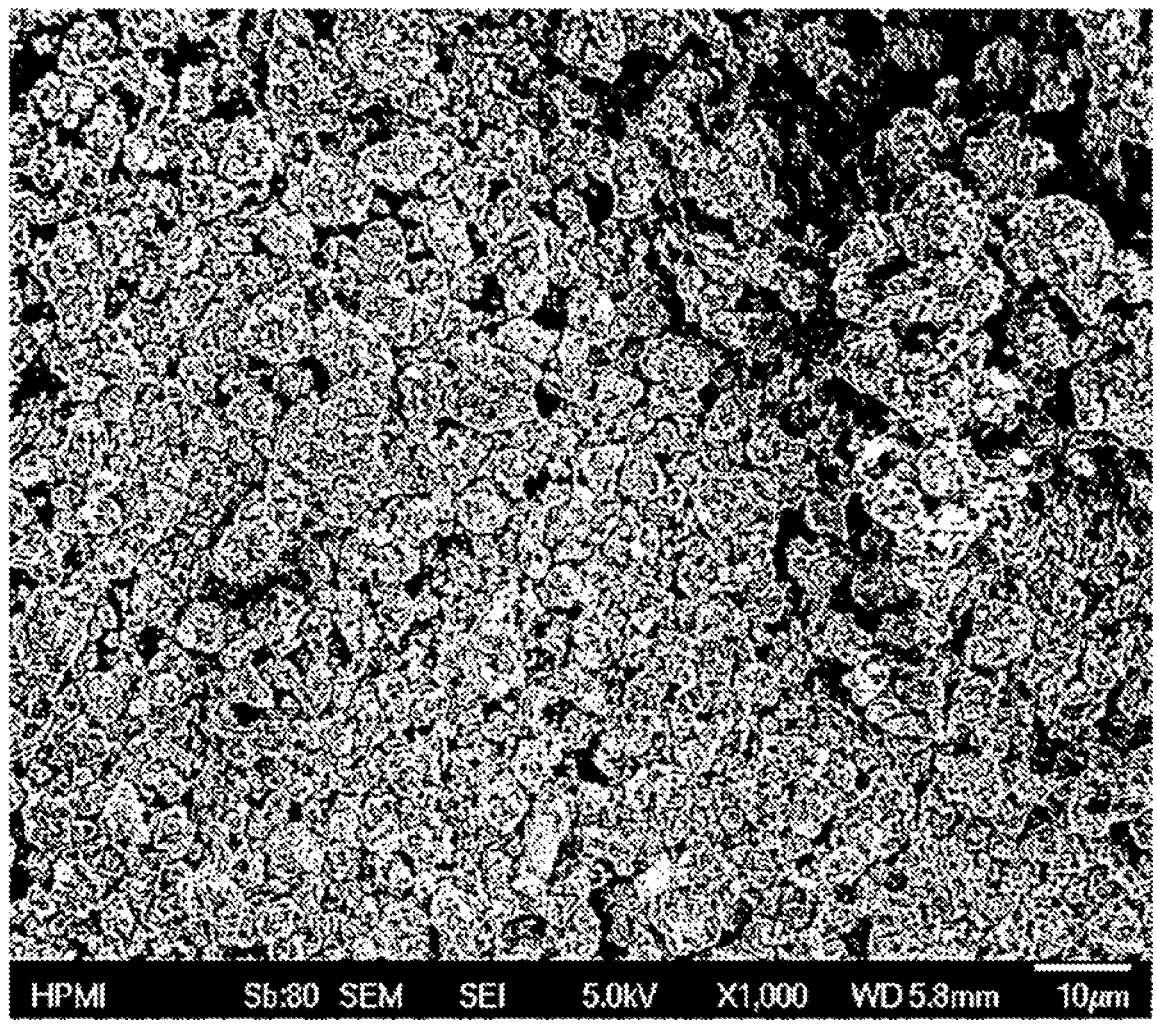
Figure 5:
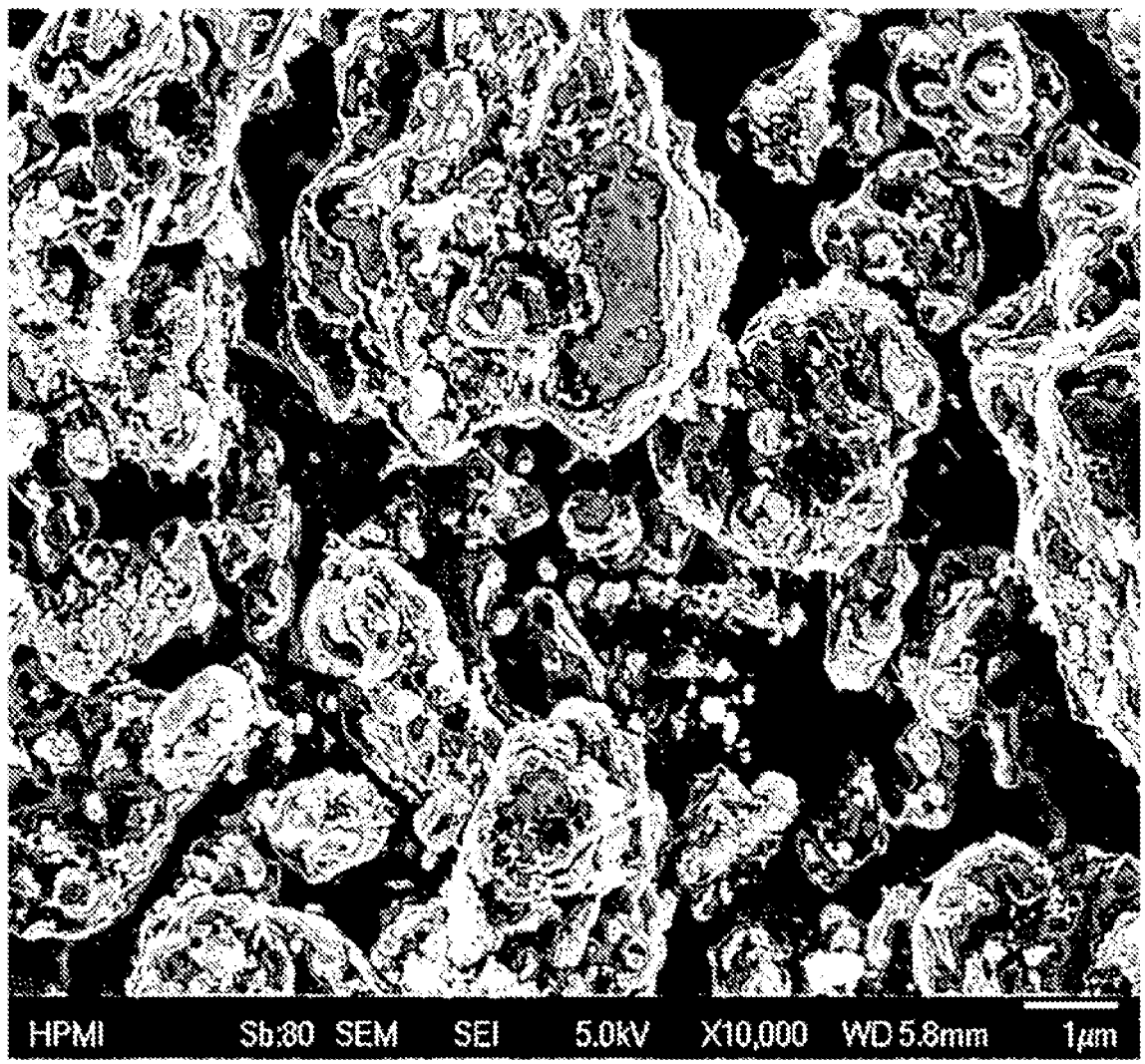
Figure 5D:
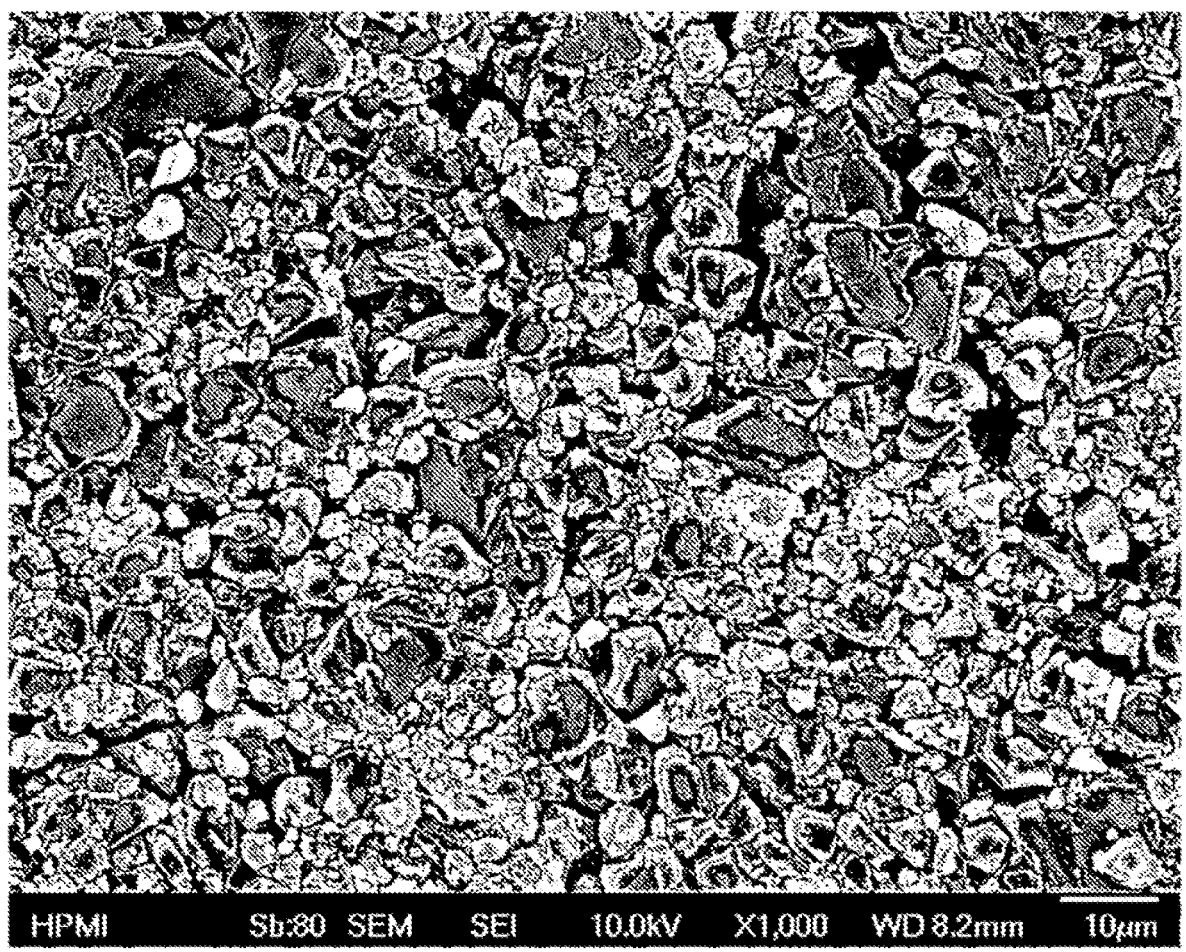
Figure 5F:
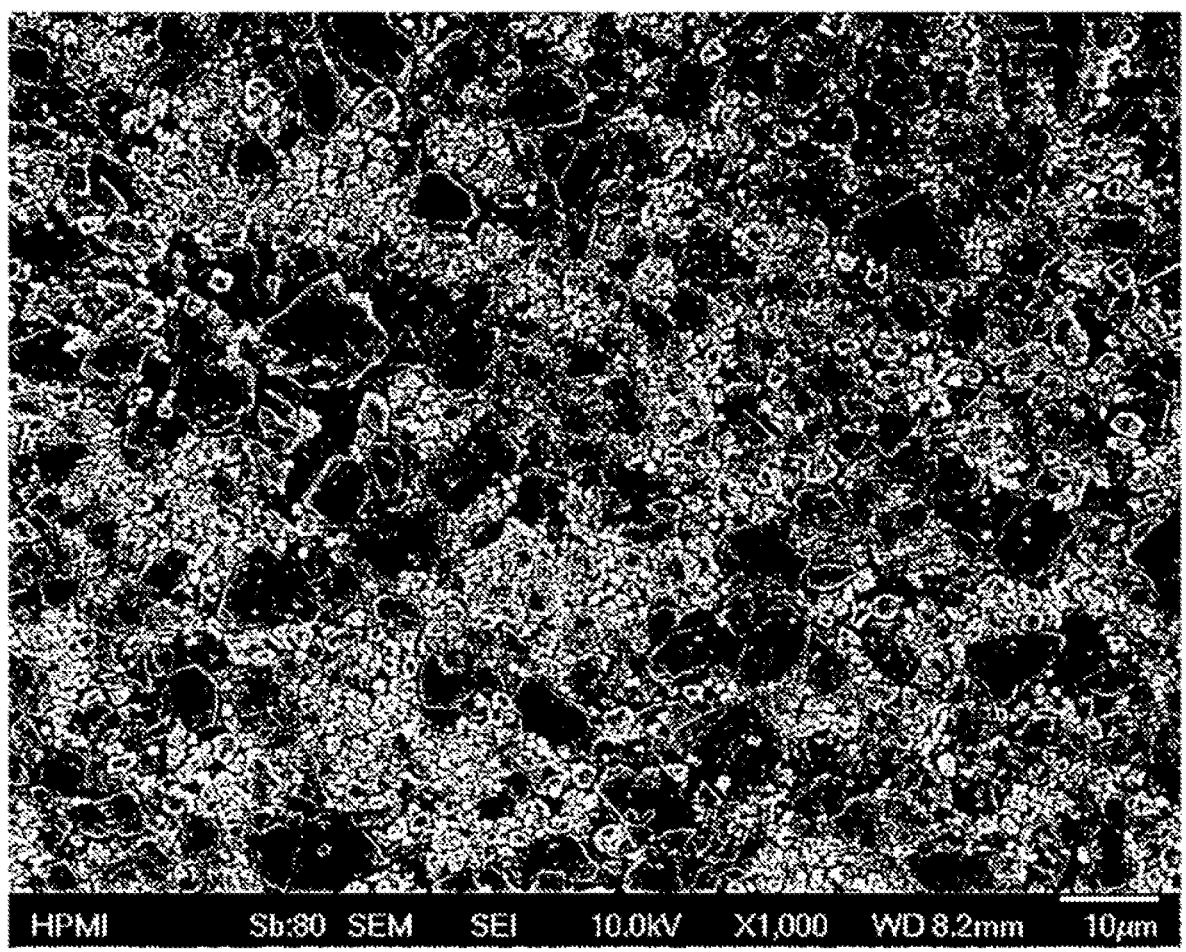
Figure 5G:
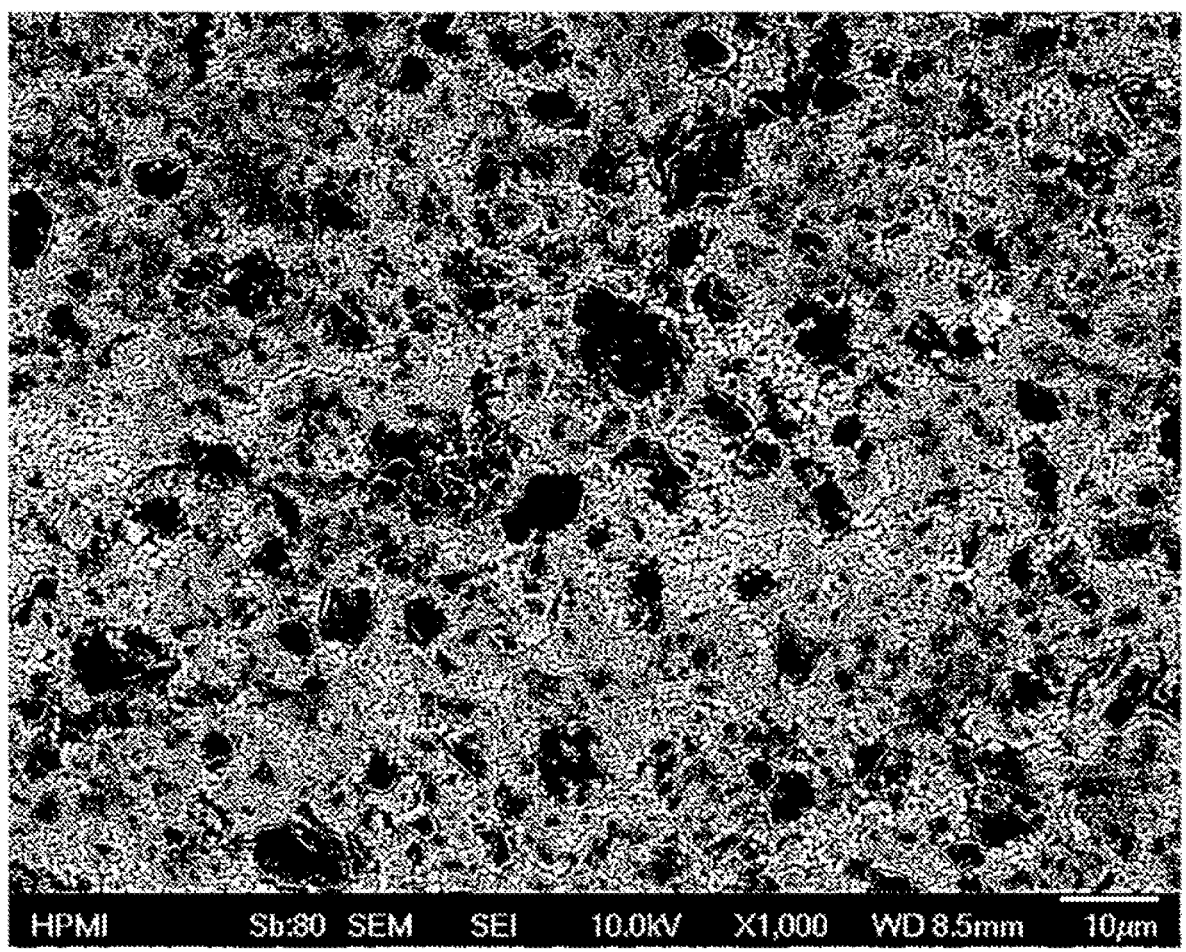
Figure 6A:
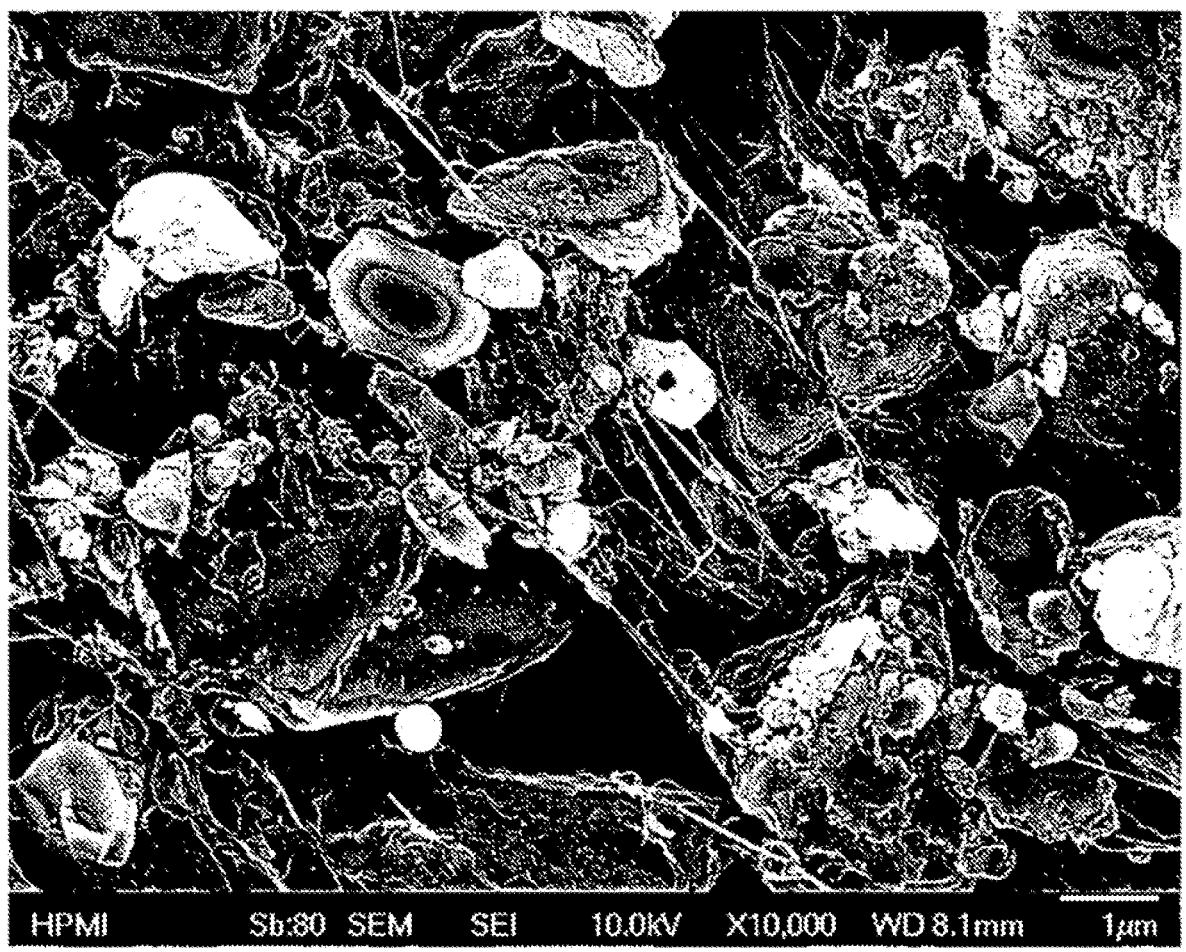
FIGS. 6(a-d) depict SEM micrographs (×10,000) of FIG. 6(a) a composite cathode 20% LFP, FIG. 6(b) a composite cathode 40% LFP, FIG. 6(c) a composite cathode 60% LFP, and FIG. 6(d) a composite cathode 80% LFP.
Figure 6B:
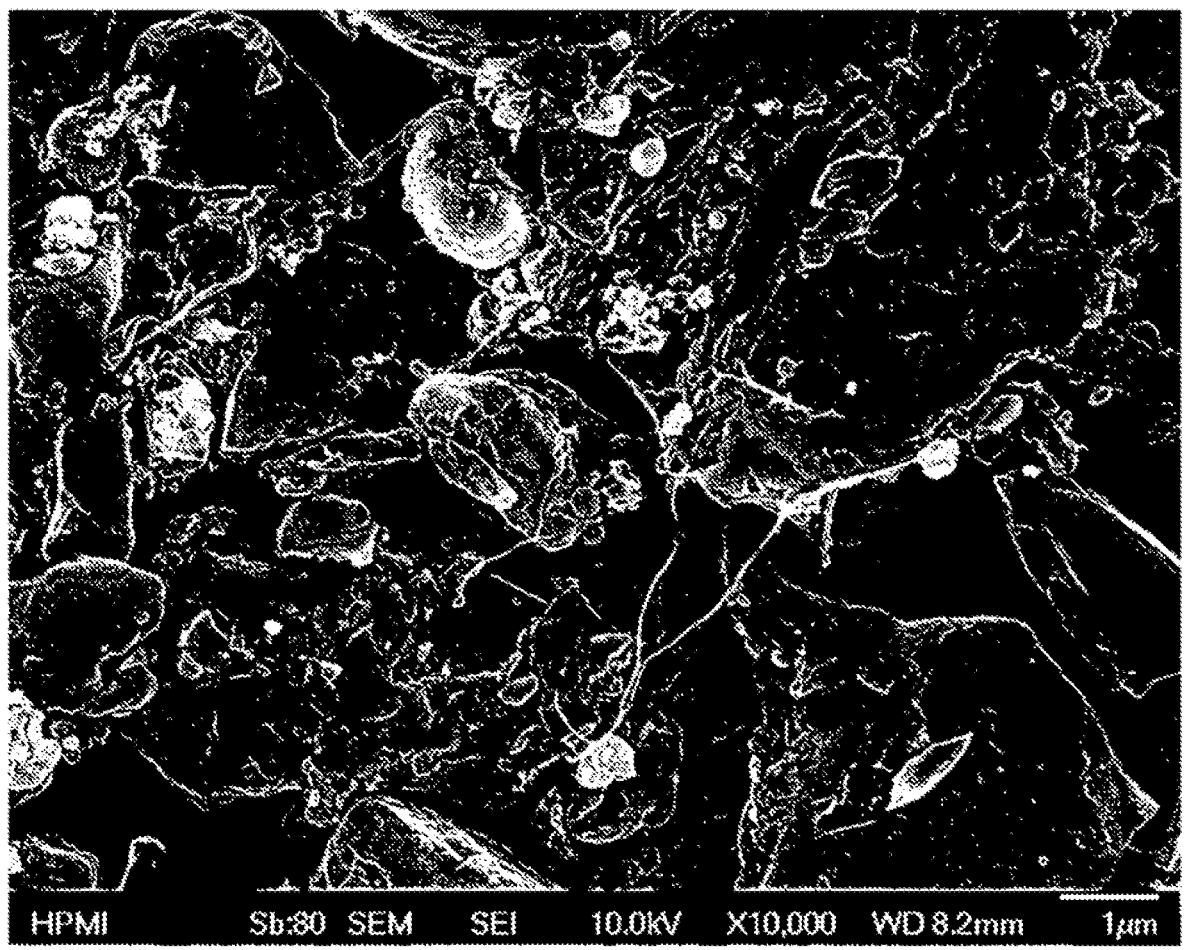
Figure 6C:
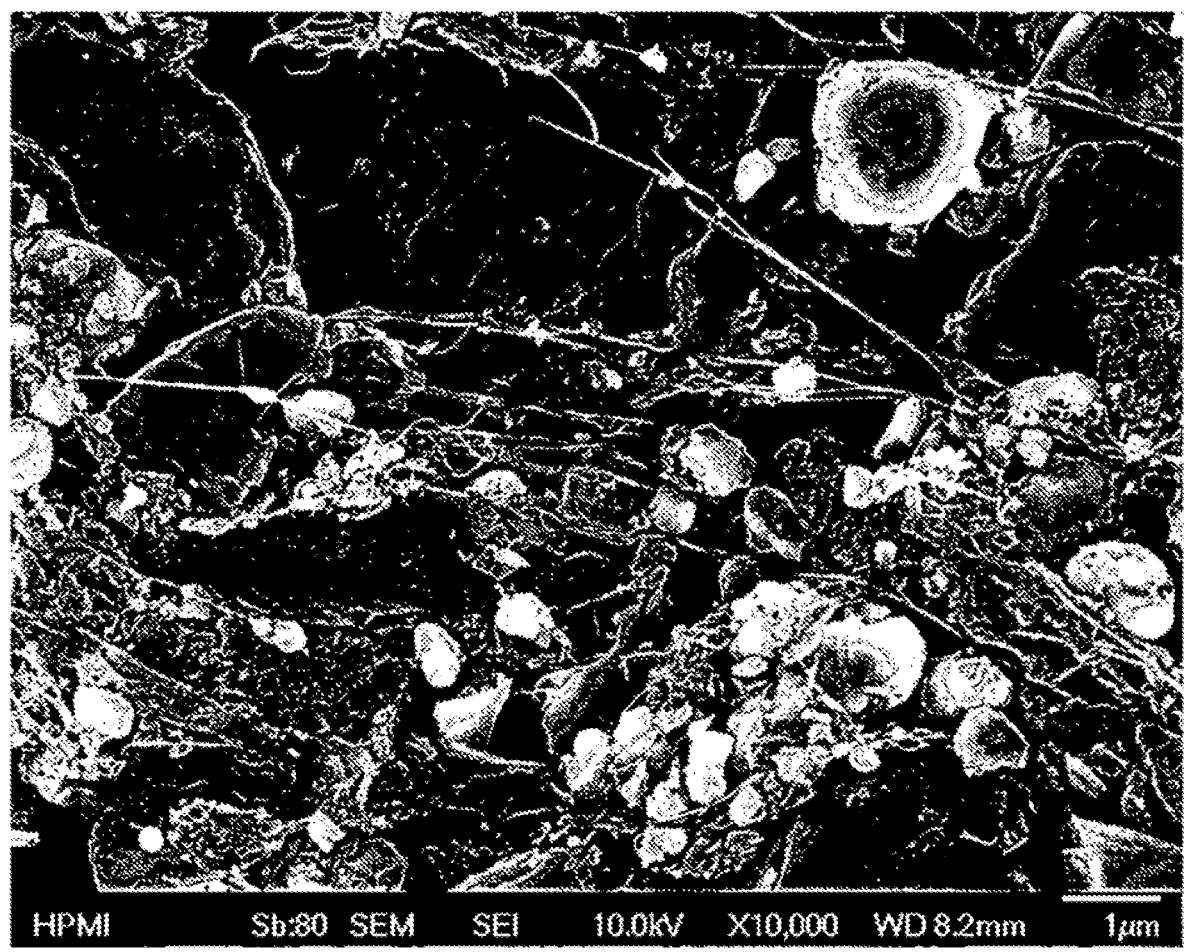
Figure 6D:
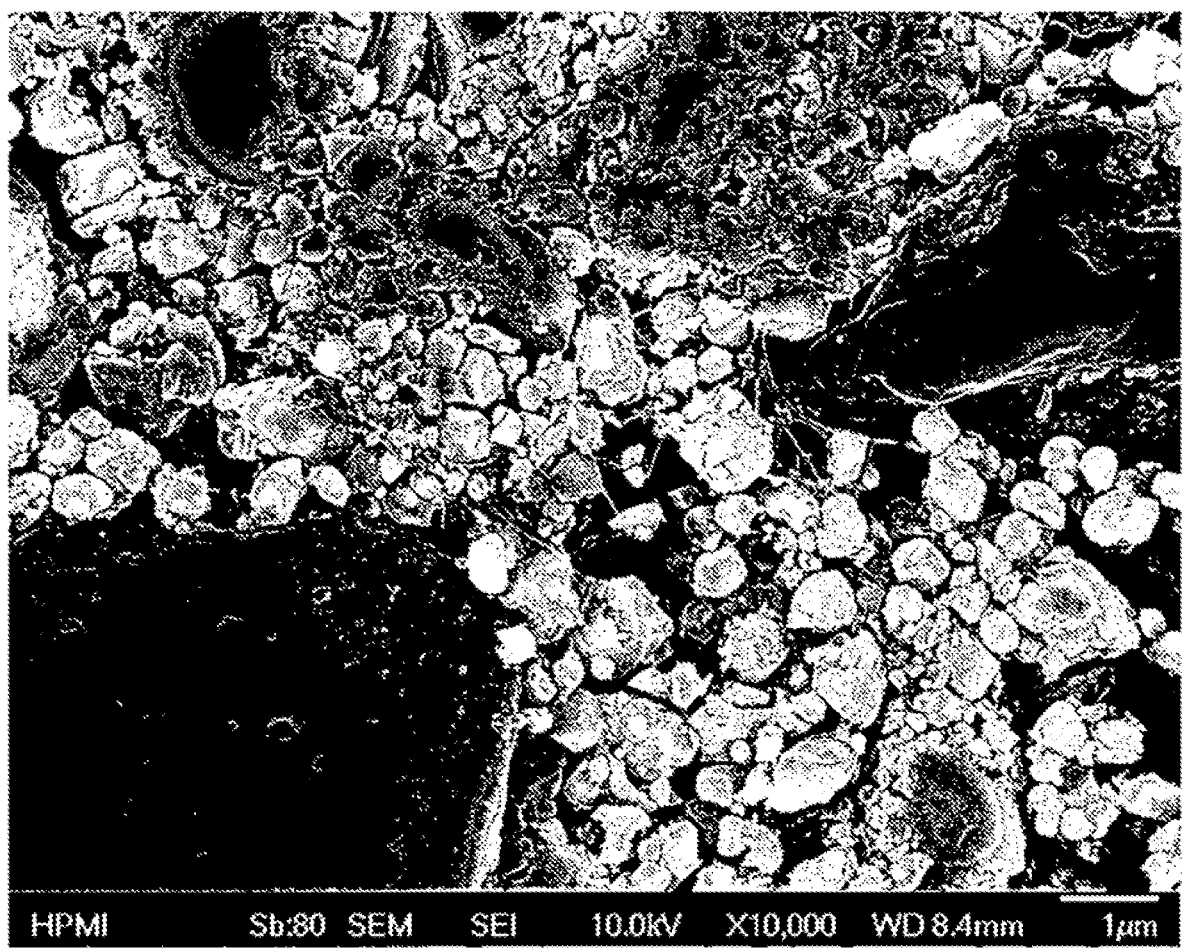
Figure 7A:
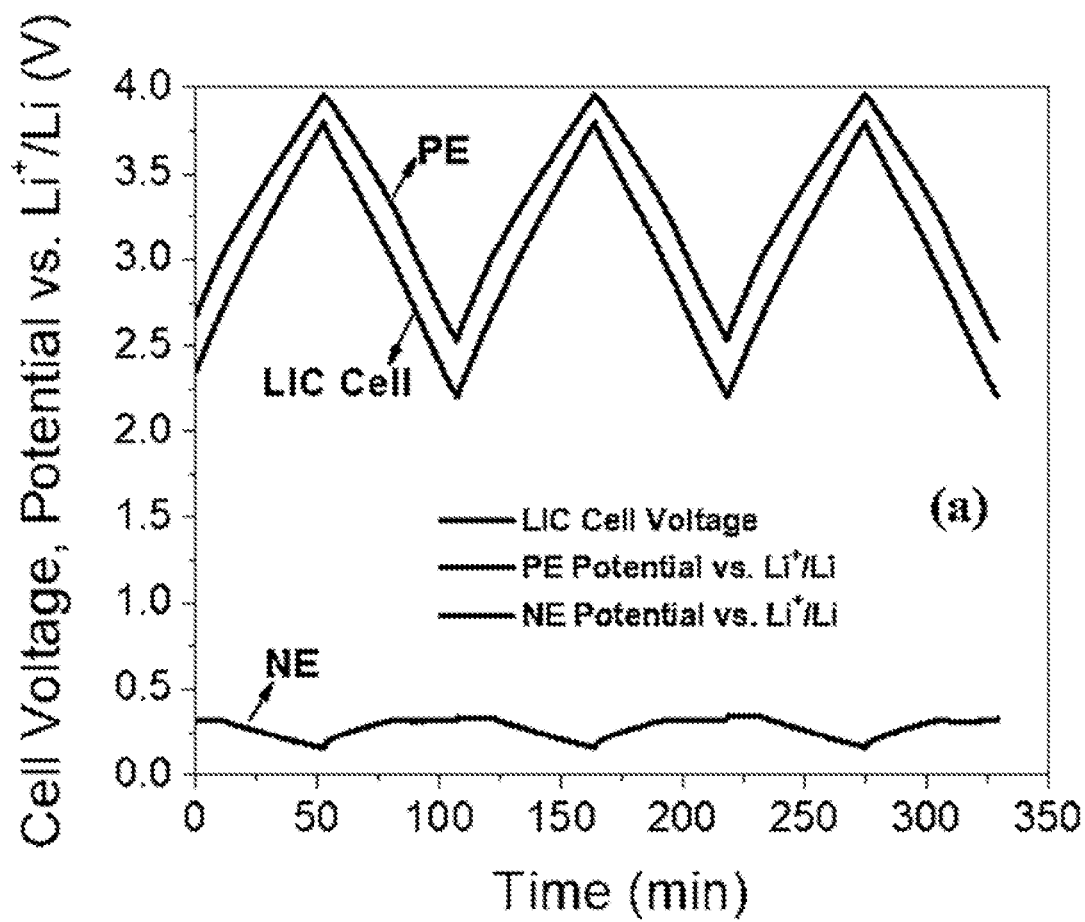
FIG. 7(a) LIC with AC/0% LFP, FIG. 7(b) 20% LFP cathode, FIG. 7(c) 40% LFP cathode, FIG. 7(d) 60% LFP cathode, and FIG. 7(e) 80% LFP cathode.
Figure 7B:
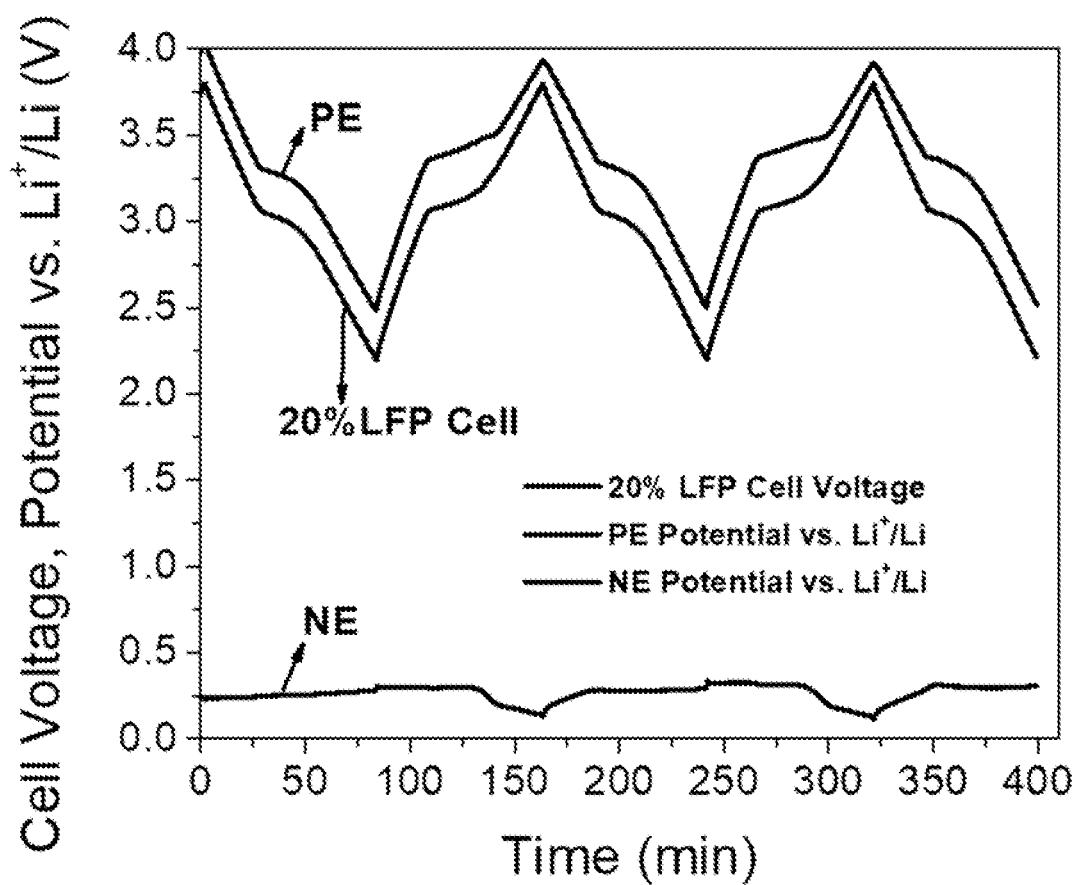
FIGS. 7(a-e) depict galvanostatic charge-discharge profiles of three-electrode pouch cells.
Figure 7C:
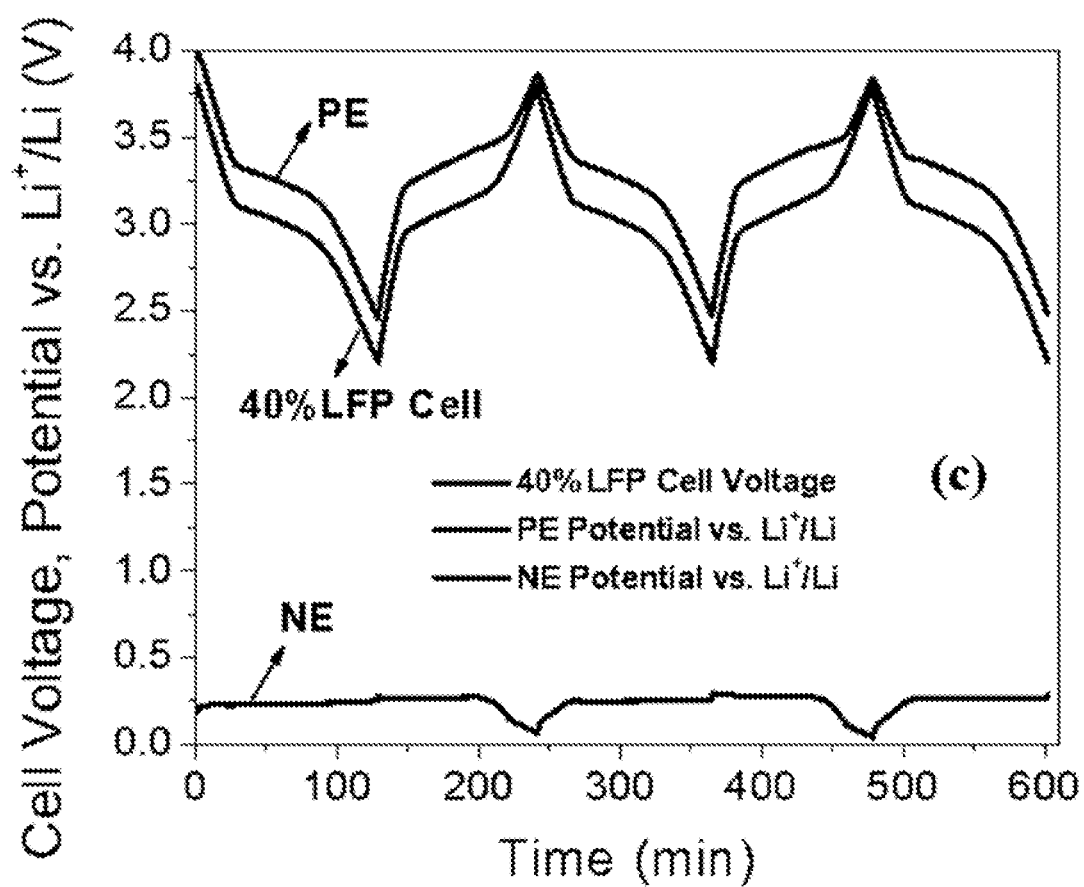
Figure 7D:
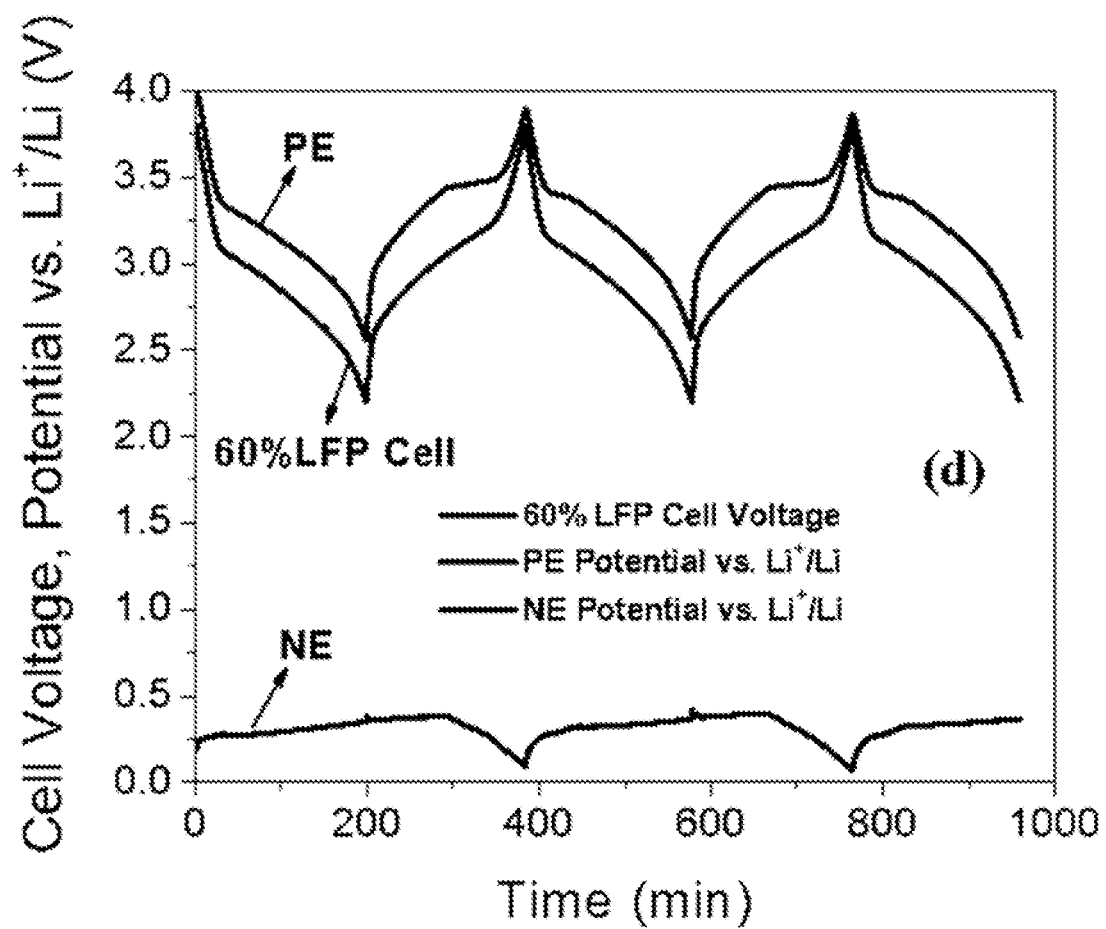
Figure 7E:
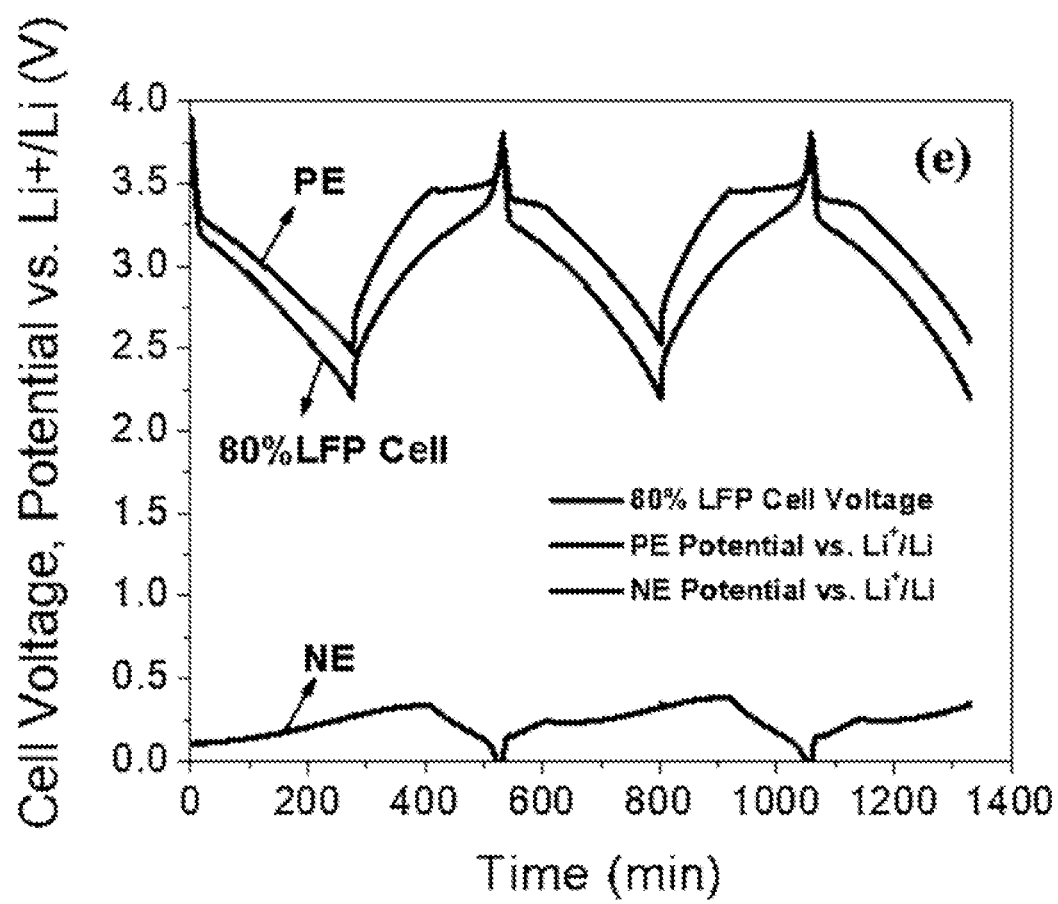

The morphological characterizations of the anode and cathode (LIC AC and H-LIBC composite cathode LFP/AC) materials are presented in FIGS. 5(a-g). FIGS. 5(a-g) depicts FIG. 5(a) SEM micrographs of a HC anode, FIG. 5(b) a LIC (AC, 0% LFP) cathode, FIGS. 5(c1) and 5(c2) LFP powders, FIG. 5(d) a composite cathode 20% LFP, FIG. 5(e) a composite cathode 40% LFP, FIG. 5(f) a composite cathode 60% LFP, and FIG. 5(g) a composite cathode 80% LFP. The SEM image of the HC anode shown in FIG. 5(a) exhibits irregular particle shapes. The average particle size is about 2 μm. The HC anode surface clearly shows the irregular shapes with well-developed sharp edges of the HC particles, which is an evidence of pulverization. FIG. 5(d) shows the SEM micrographs of the 20% LFP composite electrode surface.

There is a clear distinction of the uniformly distributed LFP particles filling the void spaces in between the larger sized AC particles (3-8 μm) which exhibit prominent sharp edges. It clearly shows the AC particles surrounding the LFP particle, hence creating an electronically highly conductive path all around its surface. This presence of a conductive path around active material particles is known to improve the electrode density and power performance. It is the same for the other hybrid composite cathodes as shown in FIGS. 5 (e) to (g). It can be seen there are more LFP particles when the percentage of LFP increases in the hybrid composite cathode.

FIGS. 6 (a-d) shows enlarged views (×10,000) of FIG. 5 SEM images for the hybrid composite cathode. FIG. 6 includes magnified SEM micrographs (×10,000) of FIG. 6(a) a composite cathode 20% LFP, FIG. 6(b) a composite cathode 40% LFP, FIG. 6(c) a composite cathode 60% LFP, and FIG. 6(d) a composite cathode 80% LFP. It can be seen from FIG. 6 that the binder PTFE is fiberized to bind the AC and LFP particles together by the dry method hybrid composite cathode electrode manufacturing method of the invention. The fiberized binder forms a matrix to support the electrode particles to form an electrode film.

The free-standing, continuous electrode film was formed by pressing the uniformly mixed powders together through the gap between two heated rolls of a roll-mill. Then the free-standing electrode films were laminated onto a substrate such as a current collector with conductive coating layers on both surfaces. This dry powder mixture allows for better control of the electrode properties and is environmentally more acceptable than traditional wet-method electrode fabrication methods because it does not require solvents and the film can be modified into a desired range before lamination.

Table 2 below summarizes the three-electrode pouch cell parameters. It can be seen from Table 2 that with more LFP % in cathode/PE, less Li film loading % (Li film weight/anode active layer weight) is required. In LIC (0% LFP) cell design, the capacity ratio of the cathode:anode is about 0.14 (1:7) so that the LIC can achieve high energy and power density, as well as longer cycle life. The Li film loading % should be about 10% to fully pre-lithiate the HC anode so as to provide enough lithium source in the LIC system. However, when LFP is added into the AC cathode to form a hybrid composite cathode, the LFP will provide an extra Li source into the H-LIBC energy storage device system.

To avoid the NE's potential being below 0 V vs. Li/Li$^+$, the maximum Li intercalation in the NE is controlled at 90% of NE capacity. The actual u-Li loading mass on surface of NE should be calculated according to the weight of LFP materials in hybrid PE. Therefore, the lithium loaded on the double-sided NE combining lithium from LFP materials can be expressed as:

$$90\% \; m_A c_{A1} = m_L c_L + m_B c_B + \frac{m_C c_C (V_{max} - V_{C-OCV})}{3.6} \quad (1)$$

The left term accounts for the contribution from the NE active materials. This contribution consists of the mass (g) of the active material present in the NE ($m_A$) and the 1ST discharge or lithium intercalation specific capacity (mAh/g) of the NE active material ($c_{A1}$).

The first term in the right of the equation is the u-Li contribution that consists of the mass (g) of the u-Li loaded at NE surface ($m_L$) and the specific capacity ($c_L$) of that Li (3,860 mAh/g). The second term accounts for the contribution of Li source from the battery materials. The contribution here consists of the mass (g) of the battery active material present in the PE ($m_B$) and the specific capacity (mAh/g) of the battery material ($c_B$).

The third and final term accounts for the contribution of Li$^+$ separated from salt LiPF$_6$ in the electrolyte and intercalated into NE caused by the electric double-layer capacitance (EDLC) materials within the PE specifically during charge from open circuit voltage ($V_{C-OCV}$) to the max. cell operating voltage ($V_{max}$). This contribution consists of the mass (g) of the EDLC material present in the PE ($m_C$) and the specific capacitance (F/g) of the EDLC material ($c_C$). This is used for the ideal starting condition based on the pristine cell and the irreversible Li loss due to solid electrolyte layer growth during initial cycles is not included in equation (1).

From equation (1), the necessary u-Li loading mass on the surface of NE should be followed by the detailed calculation formula in equation (2):

$$m_L = \frac{90\% \; m_A c_A - m_B c_B - \frac{m_C c_C (V_{max} - V_{C-OCV})}{3.6}}{c_L} \quad (2)$$

TABLE 2

Summary of Three Electrode Test Pouch Cell Parameters

| Cell Number | Cell Names | Experiment | Total PEs Weight (g) | Total PEs Active Layer Weight (g) | Battery Active Layer % | AC Active Layer Weight (g) | Battery Active Layer Weight (g) | Battery Material Specific Capacity (mAh/g) |
|---|---|---|---|---|---|---|---|---|
| 1 | Cell-LIC#1 | LIC, 0% LFP | 0.4619 | 0.2047 | 0% | 0.2047 | 0.0000 | 150 |
| 2 | Cell-LIC#2 | LIC, 0% LFP | 0.4621 | 0.2049 | 0% | 0.2049 | 0.0000 | 150 |
| 3 | Cell-LIC#3 | LIC, 0% LFP | 0.4647 | 0.2075 | 0% | 0.2075 | 0.0000 | 150 |

TABLE 2-continued

Summary of Three Electrode Test Pouch Cell Parameters

| | Cell | | | | | | | |
|---|---|---|---|---|---|---|---|---|
| Average | Cell-LIC | LIC, 0% LFP | 0.4629 | 0.2067 | 0% | 0.2057 | 0.0000 | 150 |
| 4 | Cell-20% LFP#4 | 20% LFP | 0.5095 | 0.2523 | 20% | 0.2018 | 0.0505 | 150 |
| 5 | Cell-20% LFP#5 | 20% LFP | 0.5062 | 0.2490 | 20% | 0.1992 | 0.0495 | 150 |
| 6 | Cell-20% LFP#6 | 20% LFP | 0.5085 | 0.2513 | 20% | 0.2010 | 0.0503 | 150 |
| Average | Cell-20% LFP | 20% LFP | 0.5081 | 0.2509 | 20% | 0.2007 | 0.0502 | 150 |
| 7 | Cell-40% LFP#7 | 40% LFP | 0.6064 | 0.3522 | 40% | 0.2113 | 0.1409 | 150 |
| 8 | Cell-40% LFP#8 | 40% LFP | 0.6021 | 0.3449 | 40% | 0.2089 | 0.1380 | 150 |
| 9 | Cell-40% LFP#9 | 40% LFP | 0.5959 | 0.3387 | 40% | 0.2032 | 0.1355 | 150 |
| Average | Cell-40% LFP | 40% LFP | 0.6025 | 0.3453 | 40% | 0.2072 | 0.1381 | 150 |
| 10 | Cell-60% LFP#10 | 60% LFP | 0.7092 | 0.4520 | 60% | 0.1808 | 0.2712 | 150 |
| 11 | Cell-60% LFP#11 | 60% LFP | 0.7034 | 0.4482 | 60% | 0.1785 | 0.2677 | 150 |
| 12 | Cell-60% LFP#12 | 60% LFP | 0.7101 | 0.4529 | 60% | 0.1812 | 0.2717 | 150 |
| Average | Cell-60% LFP | 60% LFP | 0.7076 | 0.4504 | 60% | 0.1801 | 0.2702 | 150 |
| 13 | Cell-80% LFP#13 | 80% LFP | 0.8618 | 0.6046 | 80% | 0.1209 | 0.4837 | 150 |
| 14 | Cell-80% LFP#14 | 80% LFP | 0.8733 | 0.6161 | 80% | 0.1232 | 0.4929 | 150 |
| 15 | Cell-80% LFP#15 | 80% LFP | 0.8832 | 0.6080 | 80% | 0.1212 | 0.4848 | 150 |
| Average | Cell-80% LFP | 80% LFP | 0.8661 | 0.6089 | 80% | 0.1218 | 0.4871 | 150 |
| 16 | Cell-60% LFP#16 | 80% LFP w/ Thicker Anode | 0.7242 | 0.4670 | 80% | 0.1868 | 0.2802 | 150 |
| 17 | Cell-60% LFP#17 | 80% LFP w/ Thicker Anode | 0.7311 | 0.4739 | 80% | 0.1896 | 0.2843 | 150 |
| 18 | Cell-60% LFP#18 | 80% LFP w/ Thicker Anode | 0.7153 | 0.4581 | 80% | 0.1832 | 0.2749 | 150 |
| Average | Cell-60% LFP + Thicker Anode | 80% LFP w/ Thicker Anode | 0.7235 | 0.4663 | 80% | 0.1865 | 0.2798 | 150 |

| Cell Number | NE Weight (g) | NE Active Layer Weight (g) | Li Sources Calculated Needed to Be Loaded on NEs(g) | Capacity Ratio of Cathode: Anode | NE After Li Loaded (g) | Actual Li Sources Pre-Loaded on NEs (g) | Li/NE, % |
|---|---|---|---|---|---|---|---|
| 1 | 0.5879 | 0.3579 | 0.0358 | 0.14 | 0.6236 | 0.0357 | 9.97% |
| 2 | 0.5919 | 0.3619 | 0.0362 | 0.14 | 0.6282 | 0.0363 | 10.03% |
| 3 | 0.5912 | 0.3612 | 0.0361 | 0.14 | 0.6281 | 0.0369 | 10.22% |
| Average | 0.5803 | 0.3603 | 0.0360 | 0.14 | 0.6266 | 0.0363 | 10.07% |
| 4 | 0.5841 | 0.3541 | 0.0335 | 0.25 | 0.6189 | 0.0328 | 9.25% |
| 5 | 0.5940 | 0.3540 | 0.0337 | 0.24 | 0.6269 | 0.0349 | 9.59% |
| 6 | 0.5825 | 0.3525 | 0.0345 | 0.25 | 0.6162 | 0.0337 | 9.58% |
| Average | 0.5869 | 0.3569 | 0.0337 | 0.24 | 0.6207 | 0.0338 | 9.47% |
| 7 | 0.5918 | 0.3618 | 0.0307 | 0.43 | 0.6229 | 0.0311 | 8.69% |
| 8 | 0.5887 | 0.3587 | 0.0305 | 0.43 | 0.6189 | 0.0302 | 8.47% |
| 9 | 0.5926 | 0.3820 | 0.0309 | 0.42 | 0.6202 | 0.0282 | 7.79% |
| Average | 0.5903 | 0.3608 | 0.0307 | 0.43 | 0.6207 | 0.0298 | 8.27% |
| 10 | 0.5884 | 0.3584 | 0.0253 | 0.69 | 0.6140 | 0.0256 | 7.14% |
| 11 | 0.5933 | 0.3533 | 0.0259 | 0.67 | 0.6182 | 0.0249 | 6.85% |
| 12 | 0.5900 | 0.3600 | 0.0254 | 0.69 | 0.6153 | 0.0253 | 7.03% |
| Average | 0.5906 | 0.3606 | 0.0256 | 0.68 | 0.6158 | 0.0253 | 7.01% |
| 13 | 0.5771 | 0.3471 | 0.0159 | 1.13 | 0.5905 | 0.0134 | 3.86% |
| 14 | 0.5791 | 0.3491 | 0.0158 | 1.15 | 0.5937 | 0.0148 | 4.18% |
| 15 | 0.5803 | 0.3503 | 0.0162 | 1.12 | 0.5971 | 0.0168 | 4.80% |
| Average | 0.5788 | 0.3488 | 0.0160 | 1.13 | 0.5938 | 0.0149 | 4.28% |
| 16 | 0.8509 | 0.4209 | 0.0312 | 0.61 | 0.6819 | 0.0310 | 7.37% |
| 17 | 0.8794 | 0.4494 | 0.0339 | 0.58 | 0.7137 | 0.0343 | 7.63% |
| 18 | 0.8653 | 0.4353 | 0.0329 | 0.58 | 0.6958 | 0.0305 | 7.01% |
| Average | 0.8652 | 0.4352 | 0.0327 | 0.59 | 0.6971 | 0.0319 | 7.33% |

It can be seen from Table 2 that based on the calculation shown in equation (2), the more LFP that is added in the hybrid composite cathode, the less Li film source that is needed to be pre-loaded on surface of the anode.

The capacity ratio $\gamma_{C:A}$ of PE:NE is calculated in below equation (3):

$$\gamma_{C:A} = \frac{m_B c_B + \frac{m_C c_C (V_{max} - V_{min})}{3.6}}{m_A c_{Ar}} \quad (3)$$

where $c_{Ar}$ is the reversible lithium intercalation and de-intercalation specific capacity (mAh/g) of the NE active material layer (hard carbon). $V_{min}$ is the minimum cell operating voltage. Based on calculation equation (3), it can be seen from Table 2 that as more LFP battery active material is added into the hybrid composite PE from LIC to 80% LFP 3-electrode H-LIBC, the $\gamma_{C:A}$ will increase from 0.14 to 1.13.

FIGS. 7(a-e) displays the charge-discharge profiles under a constant current of 11.4 mA from 3.8 to 2.2 V for the 3-electrode test cells with various cell designs and configurations. FIGS. 7(a-e) depicts galvanostatic charge-discharge profiles of three-electrode pouch cells: FIG. 7(a) LIC with AC/0% LFP, FIG. 7(b) a 20% LFP cathode, FIG. 7(c) a 40% LFP cathode, FIG. 7(d) a 60% LFP cathode, and FIG. 7(e) a 80% LFP cathode. It can be observed from FIGS. 7(a-e) that the more LFP that is added into the hybrid cathode, the less linear the charge-discharge voltage curves will be. From 0% LFP to 80% LFP, the battery-type non-linear charge-discharge curves are more and more pronounced, which results from more LFP material being added into the composite cathode. To verify the specific cell design based on equation (1) and (3), the cathode and anode potentials vs. Li/Li$^+$ are also recorded and monitored as shown in FIGS. 7(a-e).

It also can be seen from FIGS. 7(a-e) that the cell cathode maximum potentials are less than 4 V vs. Li/Li$^+$ and the anode minimum potentials are higher than 0 V vs. Li/Li$^+$. These results indicate that the H-LIBC cell design can guarantee that the cell is working without electrolyte decomposition when the cathode potential is higher than 4 V vs. Li/Li$^+$, and without anode lithium dendrite growth when the anode potential is lower than 0 V vs. Li/Li$^+$.

Table 3 displays the HC anode swing potential vs. Li/Li+ during the 3-electrode pouch cell charge-discharge processes. It can be observed from Table 3 that when more LFP is added into the composite cathode, the anode/NE swing potential range will be wider, which leads to higher stress on the anode during long-term cycling. The anode swing potential increases from 0.197 V to 0.355 V vs. Li/Li$^+$ when the LFP % increases from 0% to 80%.

TABLE 3

HC anode/NE swing potential vs. Li/Li$^+$

| Cell Type | $V_{NE}$ max (V) | $V_{NE}$ min (V) | NE Swing Voltage (V) |
| --- | --- | --- | --- |
| LIC | 0.354 | 0.157 | 0.197 |
| 20% LFP | 0.336 | 0.116 | 0.219 |
| 40% LFP | 0.331 | 0.060 | 0.270 |
| 60% LFP | 0.417 | 0.066 | 0.351 |
| 80% LFP | 0.356 | 0.001 | 0.355 |

Nine-Layer LIC & H-LIBC Laminate Cell Analysis

The nine-layer LIC and H-LIBC laminate dry cells were assembled in the dry room, all then transferred into a glovebox. The electrolyte was filled into the laminate cells to soak all the dry cells for 5 hours. After the cells were filled with electrolyte, the thin film Li sources were pressed onto the surface of the HC anode. The Li film reacted with the HC and the electrolyte, and lithium intercalated into the HC anode to pre-lithiate the anode. Table 4 displays the electrolyte soaking open circuit voltages (OCVs) of all the various nine-layer laminate cells. The peak OCVs during the 5 hour soaking process are recorded. It can be seen from Table 4 that the peak OCV decreases from 2.95 V to 2.48 V when the LFP % increases from 0% to 80%. This is caused by the thin film Li loading mass percentage of the active layer weight of HC anode (Li/NE %).

TABLE 4

Nine-layer LIC and H-LIBC laminate cell electrolyte soaking open circuit voltages

| Cell Name | Experimental | OCV After 1 h Electrolyte Soaking (V) | OCV After 3 h Electrolyte Soaking (V) | OCV After 5 h Electrolyte Soaking (V) | Peak OCV During 5 h Electrolyte Soaking (V) |
| --- | --- | --- | --- | --- | --- |
| Cell-LIC#1 | LIC cell, | 2.99 | 2.97 | 2.86 | 2.99 |
| Cell-LIC#2 | 0% | 2.91 | 2.95 | 2.88 | 2.95 |
| Cell-LIC#3 | LFP | 2.82 | 2.90 | 2.85 | 2.90 |
| Average | | 2.91 | 2.94 | 2.86 | 2.95 |
| Cell-20% LFP#4 | 20% LFP | 2.85 | 2.90 | 2.89 | 2.90 |
| Cell-20% LFP#5 | H-LIBC cell | 2.82 | 2.89 | 2.89 | 2.89 |
| Cell-20% LFP#6 | | 2.87 | 2.90 | 2.89 | 2.90 |
| Average | | 2.85 | 2.90 | 2.89 | 2.90 |
| Cell-40% LFP#7 | 40% LFP | 2.65 | 2.76 | 2.77 | 2.77 |
| Cell-40% LFP#8 | H-LIBC cell | 2.59 | 2.75 | 2.77 | 2.77 |
| Cell-40% LFP#9 | | 2.56 | 2.75 | 2.78 | 2.78 |
| Average | | 2.60 | 2.75 | 2.77 | 2.77 |
| Cell-60% LFP#10 | 60% LFP | 2.52 | 2.60 | 2.65 | 2.65 |
| Cell-60% LFP#11 | H-LIBC cell | 2.54 | 2.63 | 2.68 | 2.68 |
| Cell-60% LFP#12 | | 2.53 | 2.61 | 2.66 | 2.66 |
| Average | | 2.53 | 2.61 | 2.66 | 2.66 |
| Cell-80% LFP#13 | 80% LFP | 2.39 | 2.47 | 2.20 | 2.47 |
| Cell-80% LFP#14 | H-LIBC cell | 2.41 | 2.52 | 2.20 | 2.52 |
| Cell-80% LFP#15 | | 2.37 | 2.46 | 2.24 | 2.46 |
| Average | | 2.39 | 2.48 | 2.21 | 2.48 |
| Cell-60% LFP#16 | 60% LFP | 2.82 | 2.88 | 2.86 | 2.88 |
| Cell-60% LFP#17 | H-LIBC cell | 2.84 | 2.89 | 2.88 | 2.89 |
| Cell-60% LFP#18 | with Thicker | 2.77 | 2.81 | 2.80 | 2.81 |
| Average | Anode | 2.81 | 2.86 | 2.85 | 2.86 |

TABLE 5

Summary of the LFP/AC based nine-layer LIC and H-LIBC laminate cells parameters and C & ESR initial test results

| Cell Name | PE active layer weight (g) | AC Active Layer Weight (g) | Battery Active Layer Weight (g) | PE Capacity (mAh) | NE active layer weight (g) | NE Capacity (mAh) | Capacity Ratio of PE:NE | C (F) (80 mA) |
|---|---|---|---|---|---|---|---|---|
| Cell-LIC#1 | 2.0 | 2.0 | 0 | 97.8 | 3.5 | 700 | 0.14 | 232 |
| Cell-LIC#2 | 2.0 | 2.0 | 0 | 97.8 | 3.5 | 700 | 0.14 | 230 |
| Cell-LIC#3 | 1.9 | 1.9 | 0 | 92.9 | 3.4 | 680 | 0.14 | 232 |
| Average | 2.0 | 2.0 | 0 | 96.1 | 3.5 | 693.3 | 0.14 | 231 |
| Cell-20% LFP#4 | 2.4 | 1.9 | 0.5 | 165.6 | 3.4 | 678.1 | 0.24 | 346 |
| Cell-20% LFP#5 | 2.4 | 1.9 | 0.5 | 167.1 | 3.4 | 675.5 | 0.25 | 341 |
| Cell-20% LFP#6 | 2.4 | 1.9 | 0.5 | 167.1 | 3.4 | 671.3 | 0.25 | 336 |
| Average | 2.4 | 1.9 | 0.5 | 166.6 | 3.4 | 675.0 | 0.25 | 341 |
| Cell-40% LFP#7 | 3.2 | 1.9 | 1.3 | 283.3 | 3.4 | 679.4 | 0.42 | 518 |
| Cell-40% LFP#8 | 3.2 | 1.9 | 1.3 | 284.4 | 3.3 | 663.5 | 0.43 | 530 |
| Cell-40% LFP#9 | 3.2 | 1.9 | 1.3 | 283.6 | 3.4 | 674.3 | 0.42 | 537 |
| Average | 3.2 | 1.9 | 1.3 | 283.8 | 3.4 | 672.4 | 0.42 | 528 |
| Cell-60% LFP#10 | 4.4 | 1.8 | 2.6 | 479.9 | 3.3 | 666.6 | 0.72 | 890 |
| Cell-60% LFP#11 | 4.4 | 1.8 | 2.6 | 479.4 | 3.3 | 667.9 | 0.72 | 881 |
| Cell-60% LFP#12 | 4.4 | 1.8 | 2.6 | 480.4 | 3.4 | 676.1 | 0.71 | 897 |
| Average | 4.4 | 1.8 | 2.6 | 479.9 | 3.3 | 670.2 | 0.72 | 889 |
| Cell-80% LFP#13 | 5.7 | 1.1 | 4.6 | 743.9 | 3.3 | 657.9 | 1.13 | 1194 |
| Cell-80% LFP#14 | 5.8 | 1.2 | 4.7 | 755.1 | 3.3 | 656.1 | 1.15 | 1192 |
| Cell-80% LFP#15 | 5.6 | 1.1 | 4.5 | 726.7 | 3.3 | 659.4 | 1.1 | 1162 |
| Average | 5.7 | 1.1 | 4.6 | 741.9 | 3.3 | 657.8 | 1.13 | 1183 |
| Cell-60% LFP#16 | 4.4 | 1.8 | 2.7 | 484.9 | 4 | 801.1 | 0.61 | 938 |
| Cell-60% LFP#17 | 4.4 | 1.8 | 2.6 | 482.9 | 4 | 799.6 | 0.6 | 923 |
| Cell-60% LFP#18 | 4.4 | 1.8 | 2.6 | 481.7 | 4 | 799.4 | 0.6 | 922 |
| Average | 4.4 | 1.8 | 2.6 | 483.2 | 4.0 | 800.0 | 0.60 | 928 |

| Cell Name | ESR (mOhm, 80 mA) | C (F) (4 A) | ESR (mOhm, 4 A) | Specific Energy (Wh/kg) | Energy Density (Wh/L) | Max. Specific Power (kW/kg) | Max. Power Density (kW/L) |
|---|---|---|---|---|---|---|---|
| Cell-LIC#1 | 27 | 200 | 20 | 14 | 25 | 8 | 15 |
| Cell-LIC#2 | 23 | 198 | 17 | 14 | 26 | 10 | 18 |
| Cell-LIC#3 | 24 | 200 | 18 | 14 | 26 | 9 | 17 |
| Average | 25 | 199 | 18 | 14 | 26 | 9 | 17 |
| Cell-20% LFP#4 | 26 | 273 | 26 | 21 | 38 | 6 | 11 |
| Cell-20% LFP#5 | 30 | 272 | 25 | 21 | 37 | 7 | 12 |
| Cell-20% LFP#6 | 34 | 272 | 25 | 20 | 36 | 6 | 12 |
| Average | 30 | 272 | 25 | 21 | 37 | 6 | 12 |
| Cell-40% LFP#7 | 34 | 417 | 31 | 30 | 55 | 5 | 9 |
| Cell-40% LFP#8 | 43 | 408 | 33 | 30 | 56 | 5 | 9 |
| Cell-40% LFP#9 | 34 | 408 | 34 | 31 | 58 | 5 | 9 |
| Average | 37 | 411 | 33 | 30 | 56 | 5 | 9 |
| Cell-60% LFP#10 | 46 | 759 | 43 | 48 | 89 | 3 | 6 |
| Cell-60% LFP#11 | 46 | 756 | 44 | 47 | 88 | 3 | 6 |
| Cell-60% LFP#12 | 46 | 758 | 43 | 48 | 90 | 3 | 6 |
| Average | 46 | 758 | 43 | 48 | 89 | 3 | 6 |
| Cell-80% LFP#13 | 135 | 920 | 89 | 65 | 131 | 2 | 3 |
| Cell-80% LFP#14 | 139 | 871 | 88 | 65 | 131 | 2 | 3 |
| Cell-80% LFP#15 | 128 | 916 | 85 | 66 | 130 | 2 | 4 |
| Average | 134 | 902 | 87 | 66 | 131 | 2 | 3 |
| Cell-60% LFP#16 | 43 | 914 | 42 | 50 | 90 | 3 | 6 |
| Cell-60% LFP#17 | 43 | 928 | 44 | 50 | 88 | 3 | 6 |
| Cell-60% LFP#18 | 46 | 922 | 42 | 49 | 88 | 4 | 6 |
| Average | 44 | 921 | 43 | 50 | 89 | 3 | 6 |

More LFP addition into the hybrid cathode leads to less Li/NE % being required, which is the key factor that influences the OCV of LIC and H-LIBC during electrolyte soaking procedure. Table 5 summarizes the nine-layer LIC and H-LIBC laminate cell parameters and initial test C & ESR and other electrochemical performance results. It can be observed from Table 5 that the specific energy of the laminate cells increases from 14 Wh/kg to 66 Wh/kg when the LFP % increases from 0% to 80%.

The maximum specific power of the laminate cells decreases from 9 kW/kg to 2 kW/kg when the LFP % increases from 0% to 80%. As more LFP is added into composite hybrid cathode, higher specific energy and energy density values are attained because the specific capacity of LFP is about 3 times higher than that of AC from 3.8 to 2.2 V.

Figure 8A:
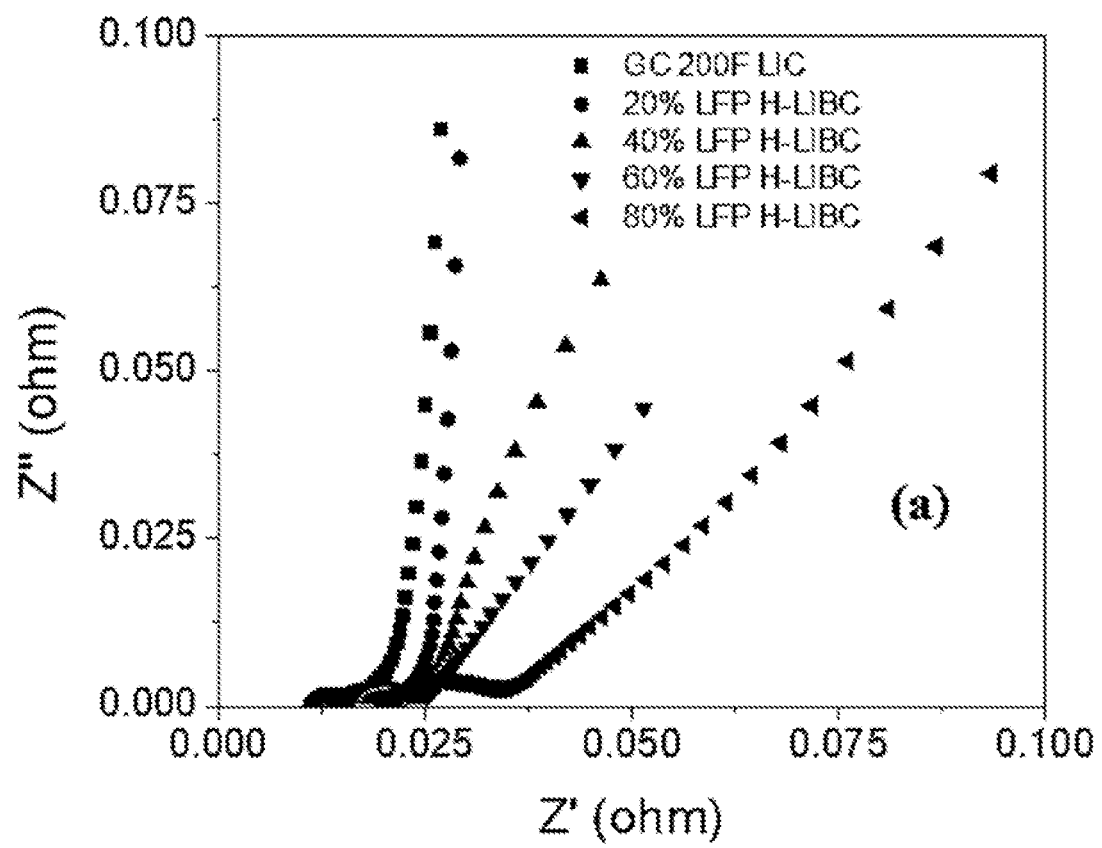
FIGS. 8(a-b) depict FIG. 8(a) the EIS curves of the nine-layer LIC and H-LIBC laminate cells, and FIG. 8(b) enlargement of FIG. 8(a).
Figure 8B:
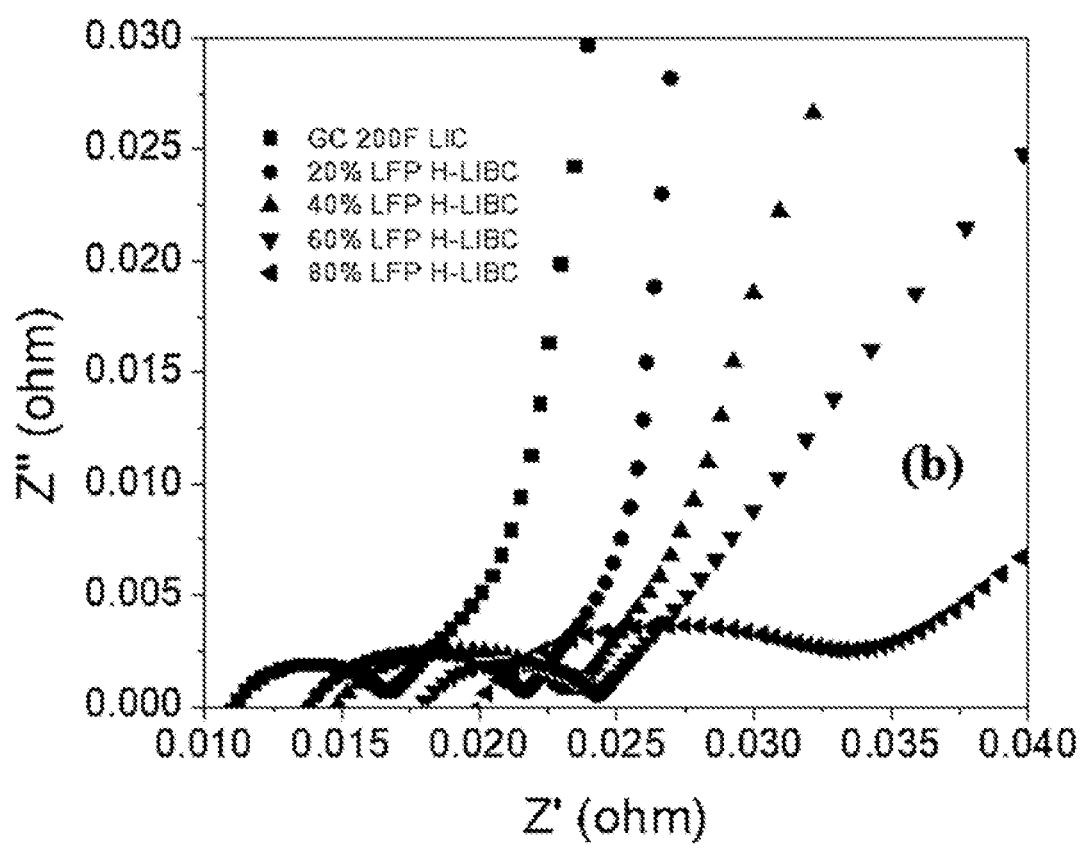

As lower power performance is seen when more LFP is added into hybrid cathode, the EIS curves as shown in FIG. 8 are scanned for all the LIC and H-LIBC nine-layer laminate cells to study the resistance distribution of all cells. FIGS. 8(a-b) depicts FIG. 8(a) the EIS curves of the nine-layer LIC and H-LIBC laminate cells, and FIG. 8(b) enlarged figures of (a). It can be observed from FIG. 8(a) that the curve changes dramatically when the LFP % increases from 0% to 80%. The resistance increase from 0% LFP to 80% LFP leads to the lower power performance of the laminate cells. It also can be seen from FIG. 8(a) that the diffusion slope decreases as more LFP is added into cathode, which indicates that LFP has a higher diffusion resistance than the AC material. The high-frequency resistance difference between all the laminate cells across the real-axis of the EIS curves can be seen from the enlarged figure of FIG. 8(a), shown in FIG. 8(b). It can be observed from FIG. 8(b) that the high-frequency resistance increases from about 0.01 to 0.02 ohm when the LFP % increases from 0% to 80%, which is possibly caused by the decrease in the electrode conductivity when more LFP is added into the hybrid composite cathode electrode. LFP is less electrical conductive than AC.

Figure 9A:
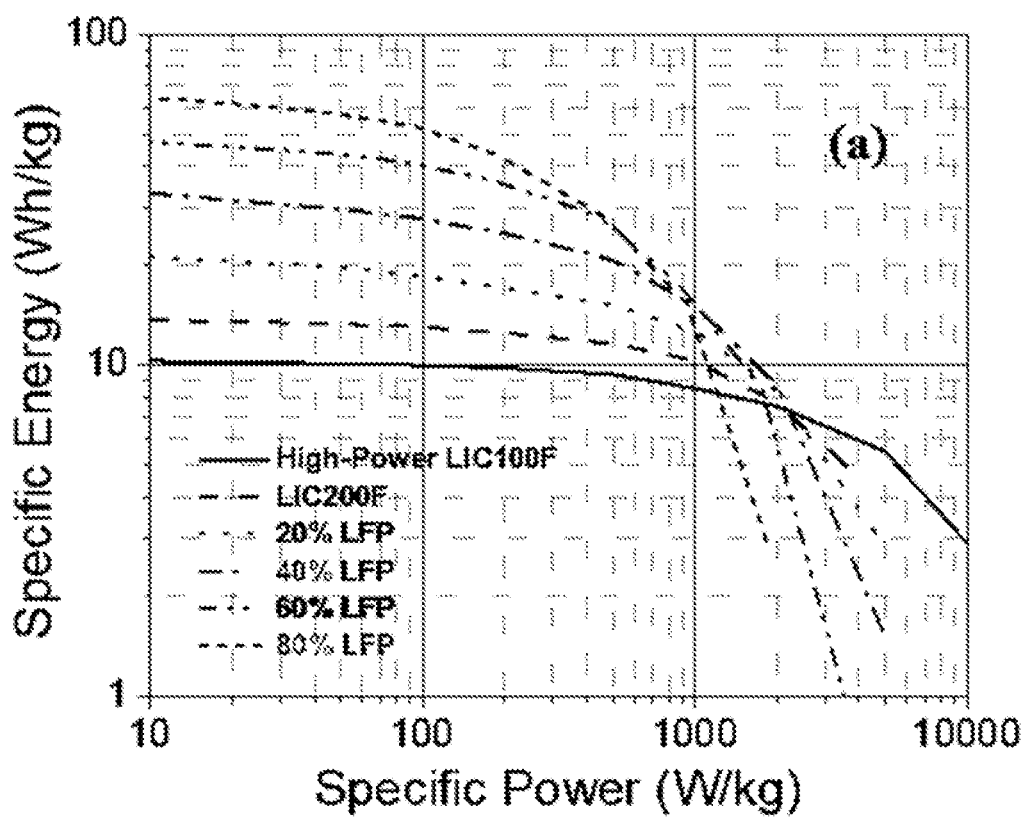
FIGS. 9(a-b) depicts FIG. 9(a) a Ragone plot of all the nine-layer LIC and H-LIBC laminate cells with high-power LIC100F cell as a control group, and FIG. 9(b) specific energy of all the nine-layer LIC and H-LIBC laminate cells as a function of specific power.
Figure 9B:
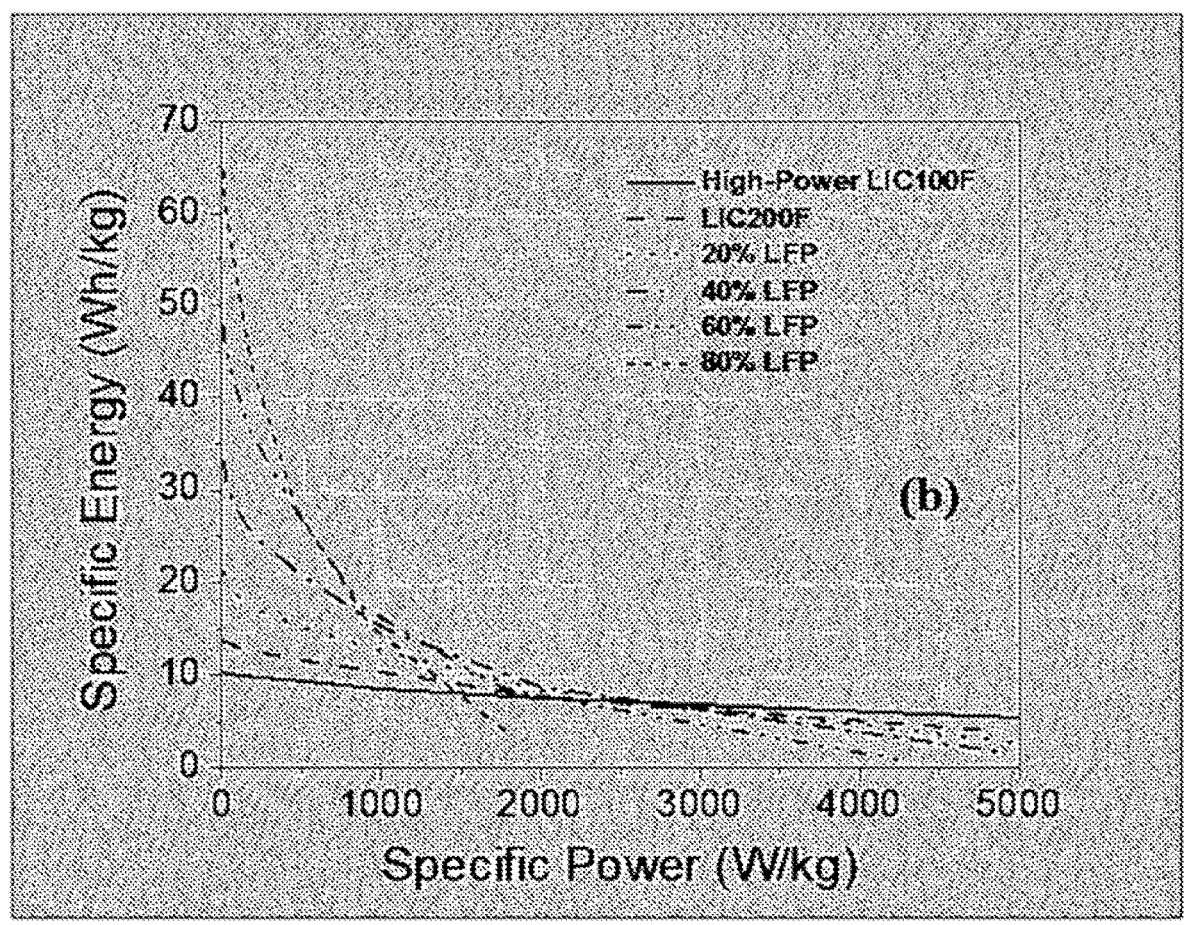

FIGS. 9(a-b) presents the Ragone Plot of all kinds of nine-layer LIC and H-LIBC laminate cells. FIGS. 9(a-b) depicts FIG. 9(a) a Ragone plot of the nine-layer LIC and H-LIBC laminate cells with a high-power LIC100F cell as a control group, and FIG. 9(b) the specific energy of the nine-layer LIC and H-LIBC laminate cells as a function of specific power. The Ragone Plot indicates that more battery material such as LFP added into hybrid composite cathode will lead to higher energy performance but lower power performance. Specific H-LIBC laminate cells can be designed according to energy density and power density requirements of specific energy storage device applications.

Figure 10:
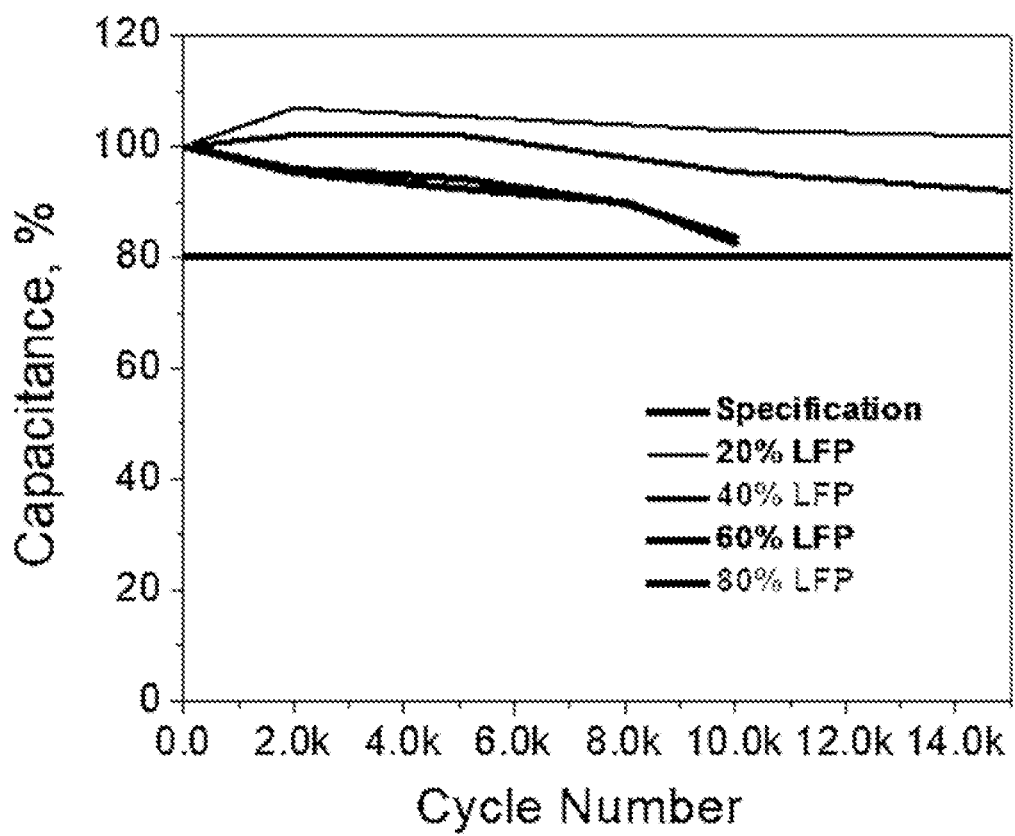
FIG. 10 depicts a cycle life performance plot of all the nine-layer H-LIBC laminate cells charge-discharged from 3.8 V to 2.2 V under a constant current of 5 A: capacitance retention as a function of cycle number.

FIG. 10 displays the cycling performance of all the nine-layer H-LIBC laminate cells. FIG. 10 depicts a cycle life performance plot of the nine-layer H-LIBC laminate cells charged-discharged from 3.8 V to 2.2 V under a constant current of 5 A: capacitance retention as a function of cycle number. It can be seen from FIG. 10 that more LFP battery material leads to decreased cycle life. The 20% and 40% LFP cell cycling performance is much better than that of the 60% and 80% LFP cells.

EXAMPLE 2

Another set of nine-layer H-LIBC laminate cells for test and evaluation were produced in the same manner as in EXAMPLE 1, except that the LIB cathode active material in the hybrid composite cathode electrode for H-LIBC was changed from Lithium Iron Phosphate (LiFePO$_4$, LFP) to LiNi$_{0.5}$Co$_{0.2}$Mn$_{0.3}$O$_2$(NMC) to produce the NMC/AC based nine-layer H-LIBC laminate cells of EXAMPLE 2. Table 6 below summarizes the NMC/AC based nine-layer LIC and H-LIBC laminate cell parameters and initial test C & ESR and other electrochemical performance results. It can be observed from Table 6 that the specific energy of laminate cells increases from 14 Wh/kg to 61 Wh/kg when the NMC % increases from 0% to 80%. However, the maximum specific power of the laminate cells decreases from 9 kW/kg to 3.0 kW/kg when the NMC % increases from 0% to 80%. Increased NMC added into the composite hybrid cathode will lead to higher specific energy and energy density because the specific capacity of NMC is about 3 times higher than that of AC from 3.8 to 2.2 V.

TABLE 6

Summary of the NMC/AC based nine-layer LIC and H-LIBC laminate cells' parameters and C&ESR initial test results

| Cell Name | PE active layer weight (g) | AC Active Layer Weight (g) | Battery Active Layer Weight (g) | PE Capacity (mAh) | NE active layer weight (g) | NE Capacity (mAh) | Capacity Ratio of PE:NE | C (F) (80 mA) |
|---|---|---|---|---|---|---|---|---|
| Cell-LIC#1 | 2.0 | 2.0 | 0 | 97.8 | 3.5 | 700 | 0.14 | 232 |
| Cell-LIC#2 | 2.0 | 2.0 | 0 | 97.8 | 3.5 | 700 | 0.14 | 230 |
| Cell-LIC#3 | 1.9 | 1.9 | 0 | 92.9 | 3.4 | 680 | 0.14 | 232 |
| Average | 2.0 | 2.0 | 0 | 96.1 | 3.5 | 693.3 | 0.14 | 231 |
| Cell-20% NMC#4 | 2.2 | 1.8 | 0.4 | 155.2 | 3.3 | 658 | 0.24 | 286 |
| Cell-20% NMC#5 | 2.2 | 1.7 | 0.4 | 153.3 | 3.3 | 660 | 0.23 | 279 |
| Cell-20% NMC#6 | 2.2 | 1.8 | 0.4 | 153.8 | 3.3 | 662 | 0.23 | 284 |
| Average | 2.2 | 1.8 | 0.4 | 154.1 | 3.3 | 660.0 | 0.23 | 283 |
| Cell-40% NMC#7 | 2.9 | 1.7 | 1.2 | 266.4 | 3.3 | 664 | 0.40 | 421 |
| Cell-40% NMC#8 | 2.7 | 1.6 | 1.1 | 248.6 | 3.3 | 660 | 0.38 | 389 |
| Cell-40% NMC#9 | 2.8 | 1.7 | 1.1 | 253.2 | 3.3 | 662 | 0.38 | 402 |
| Average | 2.7 | 1.7 | 1.1 | 256.1 | 3.3 | 662.0 | 0.39 | 396 |
| Cell-60% NMC#10 | 4.2 | 1.7 | 2.5 | 469.1 | 3.3 | 656 | 0.71 | 669 |
| Cell-60% NMC#11 | 4.2 | 1.7 | 2.5 | 471.2 | 3.3 | 660 | 0.71 | 705 |
| Cell-60% NMC#12 | 4.2 | 1.7 | 2.5 | 467.1 | 3.4 | 660 | 0.71 | 679 |
| Average | 4.2 | 1.7 | 2.5 | 469.1 | 3.3 | 659.3 | 0.71 | 691 |
| Cell-80% NMC#13 | 6.7 | 1.3 | 5.3 | 893.2 | 3.3 | 660 | 1.36 | 1121 |
| Cell-80% NMC#14 | 6.4 | 1.3 | 5.1 | 854.6 | 3.3 | 656 | 1.30 | 1066 |
| Cell-80% NMC#15 | 6.6 | 1.3 | 5.3 | 879.8 | 3.3 | 660 | 1.33 | 1097 |
| Average | 6.6 | 1.1 | 5.2 | 875.9 | 3.3 | 659.3 | 1.33 | 1095 |

| Cell Name | ESR (mOhm, 80 mA) | C (F) (4 A) | ESR (mOhm, 4 A) | Specific Energy (Wh/kg) | Energy Density (Wh/L) | Max. Specific Power (kW/kg) | Max. Power Density (kW/L) |
|---|---|---|---|---|---|---|---|
| Cell-LIC#1 | 27 | 200 | 20 | 14 | 25 | 8 | 15 |
| Cell-LIC#2 | 23 | 198 | 17 | 14 | 26 | 10 | 18 |
| Cell-LIC#3 | 24 | 200 | 18 | 14 | 26 | 9 | 17 |
| Average | 25 | 199 | 18 | 14 | 26 | 9 | 17 |
| Cell-20% NMC#4 | 30 | 206 | 27 | 19 | 33 | 7 | 12 |
| Cell-20% NMC#5 | 43 | 202 | 31 | 18 | 32 | 6 | 10 |
| Cell-20% NMC#6 | 36 | 200 | 30 | 19 | 33 | 6 | 11 |
| Average | 36 | 203 | 29 | 18 | 32 | 6 | 11 |
| Cell-40% NMC#7 | 34 | 203 | 27 | 27 | 48 | 6 | 12 |
| Cell-40% NMC#8 | 34 | 191 | 27 | 24 | 44 | 6 | 11 |

TABLE 6-continued

Summary of the NMC/AC based nine-layer LIC and H-LIBC laminate
cells' parameters and C&ESR initial test results

| | | | | | | | |
|---|---|---|---|---|---|---|---|
| Cell-40% NMC#9 | 34 | 193 | 29 | 26 | 46 | 6 | 11 |
| Average | 34 | 192 | 28 | 25 | 45 | 6 | 11 |
| Cell-60% NMC#10 | 34 | 373 | 30 | 42 | 77 | 6 | 10 |
| Cell-60% NMC#11 | 39 | 360 | 33 | 43 | 79 | 5 | 9 |
| Cell-60% NMC#12 | 39 | 341 | 33 | 40 | 74 | 5 | 9 |
| Average | 37 | 358 | 32 | 42 | 77 | 5 | 9 |
| Cell-80% NMC#13 | 116 | 549 | 53 | 62 | 125 | 3 | 6 |
| Cell-80% NMC#14 | 120 | 625 | 57 | 60 | 122 | 3 | 6 |
| Cell-80% NMC#15 | 124 | 571 | 57 | 61 | 122 | 3 | 5 |
| Average | 120 | 582 | 56 | 61 | 123 | 3 | 6 |

The Hybrid Lithium-Ion Battery-Capacitor (H-LIBC) Energy Storage Devices shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed for providing a Hybrid Lithium-Ion Battery-Capacitor (H-LIBC) Energy Storage Device in accordance with the spirit of the invention, and such changes, alternations and modifications as would occur to those skilled in the art are considered to be within the scope of this invention as broadly defined in the appended claims.

The invention is not limited in its application to the details of construction and to the arrangement of the components set forth in the foregoing description or illustrated in the drawings. The invention is capable of other embodiments and of being practiced and carried out in various ways. In addition, it is to be understood that the phraseology and terminology employed herein are for the purpose of description and should not be regarded as limiting.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of making a hybrid lithium-ion battery-capacitor H-LIBC, comprising the steps of:
   preparing a hybrid composite cathode by the steps of:
   providing a lithium ion battery (LIB) active material comprising a lithium metal oxide, a lithium ion capacitor (LIC) active material comprising at least one selected from the group of activated carbon and carbon black, and a binder as dry powders;
   mixing the LIC active material, the LIB active material, and the binder to create a homogenous cathode dry powder mixture;
   pressing the cathode dry powder to produce a free-standing cathode film;
   laminating the cathode film onto a current collector;
   preparing an anode by the steps of:
   providing an anode active material having a surface, and a thin Li film source;
   pre-positioning and pressing the Li film source on the surface of the anode active material, wherein the mass of the Li film source is calculated by the equation:

$$m_{Li} = \frac{xm_A c_{A1} - m_B c_B - \frac{m_C c_C (V_{max} - V_{c\text{-}OCV})}{3.6}}{c_{Li}}$$

where $m_{Li}$ is the Li source mass to be pre-lithiated on the surface of the anode (g), $c_{Li}$ is the specific capacity of lithium and is 3,860 mAh/g, $m_A$ is the anode active layer weight (g), $m_B$ is the Li-ion battery (LIB) active material weight (g), $m_C$ is the Li-ion capacitor (LIC) active material weight (g), $c_{A1}$ is the first lithium intercalation (1st discharge) specific capacity (mAh/g) of the anode electrode, $c_B$ is the specific capacity (mAh/g) of the LIB active material, $c_C$ is the specific capacitance (F/g) of the LIC active material layer, $V_{max}$ is the maximum operating voltage of H-LIBC, $V_{c\text{-}OCV}$ is the open-circuit voltage of LIC activated material is from 2.5 V to 3.2 V, and x is between 0.5 to 1.0
   providing a separator;
   providing an electrolytic solution comprising a lithium salt electrolyte;
   combining the hybrid composite cathode, the pre-lithiated anode, the separator and the electrolyte to form a H-LIBC energy storage device;
   and wherein the capacity ratio $\gamma_{C:A}$ of the hybrid composite cathode electrode to the anode electrode is from 0.14 to 0.95, and the specific surface area of the LIC active material is greater than 1,000 m²/g.

2. The method of claim 1, wherein the lithium metal oxide comprises at least one selected from the group consisting of lithium metal oxide comprising $LiCoO_2$ (lithium cobalt oxide), $LiNi_{0.8}Co_{0.15}Al_{0.05}O_2$ (NCA), $LiNi_{0.5}Mn_{0.3}Co_{0.2}O_2$ (NMC532), $LiNi_{0.6}Mn_{0.2}Co_{0.2}O_2$ (NMC622), $LiNi_{0.8}Mn_{0.1}Co_{0.1}O_2$ (NMC811), and $LiFePO_4$ (LFP).

3. The method of claim 1, wherein the hybrid composite cathode electrode is fabricated by a dry method manufacturing process, wherein the binder used in said dry method manufacturing process includes polytetrafluoroethylene (PTFE).

4. The method of claim 1, wherein the active layer porosity of the hybrid composite cathode electrode is from 20% to 75%.

5. The method of claim 1, wherein the anode electrode active material comprises at least one selected from the group consisting of hard carbon, graphite, and soft carbon.

6. The method of claim 5, wherein the mass median diameter (D50) particle size of the anode electrode active material is from 1 μm to 10 μm.

7. The method of claim 1, wherein the anode electrode comprises styrene-butadiene rubber (SBR) and carboxymethyl cellulose (CMC) as binders, and wherein the mass ratio of SBR binder to CMC binder is from 1:5 to 5:1.

8. The method of claim 1, wherein the thickness of the Li film source is from 2 μm to 40 μm.

9. The method of claim 1, wherein the capacity ratio $\gamma_{C:A}$ of the hybrid composite cathode to the anode electrode is described by the equation:

$$\gamma_{C:A} = \frac{m_B c_B + \frac{m_C c_C (V_{max} - V_{min})}{3.6}}{m_A c_{Ar}}$$

where $V_{min}$ is the minimum operating voltage of the H-LIBC, and $c_{Ar}$ is the reversible lithium intercalation and de-intercalation specific capacity (mAh/g) of the anode active material layer.

10. The method of claim 1, wherein the peak open circuit voltage of the H-LIBC energy storage device during the first 5 hours of an electrolyte soaking process is from 2.4 V to 3.0 V.

11. The method of claim 1, wherein the H-LIBC energy storage device comprises a H-LIBC laminate cell.

12. The method of claim 1, wherein the anode electrode is double sided, and each side of the double sided anode is pre-lithiated with the Li film source after electrolyte filling and soaking processes.

13. The method of claim 12, wherein the amount of Li pre-lithiated onto the surface of the anode to fully pre-lithiate the anode is 4 to 12% based upon the Li pre-lithiated mass/anode active layer mass.

14. The method of claim 12, wherein the anode electrode active material comprises at least one selected from the group consisting of hard carbon, graphite, and soft carbon.

15. The method of claim 12, wherein the mass median diameter (D50) particle size of the anode electrode active material is from 1 μm to 10 μm.

16. The methods of claim 12, wherein the anode electrode comprises styrene-butadiene rubber (SBR) and carboxymethyl cellulose (CMC) as binders, and wherein the mass ratio of SBR binder to CMC binder is from 1:5 to 5:1.

17. The method of claim 1, wherein the pressing of the cathode dry powder mixture is at a temperature of at least 50° C.

18. The method of claim 1, wherein the laminating of the cathode film onto a current collector is performed by the step of passing the cathode film and the current collector through the gap of two rollers maintained at a temperature of at least 100° C.

* * * * *